(12) United States Patent
Hasegawa et al.

(10) Patent No.: US 7,660,308 B2
(45) Date of Patent: Feb. 9, 2010

(54) TRANSMISSION APPARATUS

(75) Inventors: Kenichi Hasegawa, Kawasaki (JP); Akira Nozawa, Kawasaki (JP); Minoru Tateno, Kawasaki (JP); Kenichi Miyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 11/583,117

(22) Filed: Oct. 19, 2006

(65) Prior Publication Data

US 2008/0002706 A1   Jan. 3, 2008

(30) Foreign Application Priority Data

Jun. 29, 2006  (JP)  ............... 2006-179024

(51) Int. Cl.
*H04L 12/46* (2006.01)
(52) U.S. Cl. ...................... 370/392; 370/410
(58) Field of Classification Search ............... 370/392, 370/395, 410, 466, 227, 216, 219, 463, 357, 370/386
See application file for complete search history.

(56) References Cited

U.S. PATENT DOCUMENTS

| | | | | |
|---|---|---|---|---|
| 5,204,857 A | * | 4/1993 | Obara | ................ 370/354 |
| 6,977,889 B1 | | 12/2005 | Kawaguchi et al. | |
| 7,289,511 B2 | * | 10/2007 | Christie et al. | ........... 370/395.1 |
| 2005/0135232 A1 | * | 6/2005 | Taneoka | ................ 370/216 |
| 2005/0152349 A1 | * | 7/2005 | Takeuchi et al. | ........... 370/373 |
| 2005/0180420 A1 | * | 8/2005 | Kurashima et al. | .......... 370/389 |
| 2005/0198247 A1 | * | 9/2005 | Perry et al. | ................ 709/223 |

OTHER PUBLICATIONS

Patent Abstract of Japan, Japanese Publication No. 2005-045573, Published Feb. 17, 2005. (1pg).

* cited by examiner

*Primary Examiner*—Dang T Ton
*Assistant Examiner*—Nourali Mansoury
(74) *Attorney, Agent, or Firm*—Staas & Halsey LLP

(57) ABSTRACT

A transmission apparatus that does not include a plurality of switches, that cross-connects a signal, and that can handle various redundancy settings determined by a user. An address information generation section generates address information indicative of the destination of a signal, from redundancy setting information and cross connect setting information. An activation information setting section activates and deactivates activation information included in the address information when failure occurs. An address information insertion section inserts the address information stored in an address information storage section into the signal and outputs the signal to a bus. A signal output section receives the signal having the address information that is the same as own address information and outputs the signal to a next stage in the case of the activation information indicating activation.

7 Claims, 30 Drawing Sheets

TRANSMISSION APPARATUS

CROSS-REFERENCE TO RELATED APPLICATIONS

This application is based upon and claims the benefits of priority from the prior Japanese Patent Application No. 2006-179024, filed on Jun. 29, 2006, the entire contents of which are incorporated herein by reference.

BACKGROUND OF THE INVENTION (1) Field of the Invention

This invention relates to a transmission apparatus and, more particularly, to a transmission apparatus for cross-connecting a signal.

(2) Description of the Related Art

Usually a transmission apparatus (synchronous optical network (SONET)/synchronous digital hierarchy (SDH) transmission apparatus, for example) on a ring network includes a currently used system and a spare system in case of a communication failure. Such a transmission apparatus receives a signal sent from a low-speed network at a lower layer and adds the signal to a high-speed network at a higher layer. In addition, such a transmission apparatus receives a signal sent from the high-speed network at the higher layer and drops the signal onto the low-speed network at the lower layer. Such a transmission apparatus also passes a signal it received to another transmission apparatus. An SDH frame is transmitted to a high-speed transmission line in the ring network and the signal sent from the lower layer is included in a payload of the SDH frame.

FIG. 19 shows an example of mounting units in a transmission apparatus. As shown in FIG. 19, a transmission apparatus has a shelf 100 and units such as an interface channel switch unit (IFSW) 0, an IFSW 1, an IFSW 3, interface units (INFs) 1 through 6, SYNCs 0 and 1, STS1 switch fabric units (STSSWs) 0 and 1, a CPU, a HUB, and a DCC are mounted. STS1 stands for Synchronous Transport Signal Level 1.

As will be described later, the IFSW 0, the IFSW 1, and the IFSW 3 are units for switching units from a currently used system to a spare system in the case of a unit failure. The INFs 1 through 6 are interface units for sending and receiving optical or electrical signals. The SYNCs 0 and 1 are units for generating a synchronizing clock for each unit. As will be described later, each of the STSSWs 0 and 1 is a unit including a switch fabric and a cross connect. The CPU is a control unit for controlling each unit. The HUB is an alarm unit for orderwire (OW)/housekeeping (HK)/office. The DCC is a unit for a data communication channel (DCC). The transmission apparatus includes the above units for performing communication.

As stated above, the transmission apparatus has a mechanism which can deal with failure. The transmission apparatus includes line redundancy for dealing with a line failure, unit redundancy for dealing with a unit failure, and a path redundancy for dealing with a path failure as applications for dealing with failure.

FIG. 20 is a view for describing one-plus-one line redundancy. In FIG. 20, two transmission apparatus installed in a and b stations are shown. In FIG. 20, each of the two transmission apparatus includes only INFs 1 through 3 and a switch fabric included in an STSSW 0 as a result of simplifying the transmission apparatus shown in FIG. 19. W (work) and P (protect) shown in each INF 1 and each INF 2 in FIG. 20 indicate a currently used system and a spare system respectively.

With the one-plus-one line redundancy, a unit which belongs to the currently used system and a unit which belongs to the spare system send signals and a switch fabric at the receiving end switches a signal to be received and receives it.

For example, the switch fabric included in the transmission apparatus installed in the a station receives a signal sent from a tributary side (lower layer side) by the INF 3 and outputs it to both of the INFs 1 and 2. That is to say, the transmission apparatus installed in the a station outputs the signal to 0-system and 1-system lines on a line side (higher layer side). The switch fabric included in the transmission apparatus in the b station at the receiving end switches a switch (indicated by SW in FIG. 20) for outputting the signals sent via the 0-system and 1-system lines to the INF 3. Similarly, the switch fabric included in the transmission apparatus installed in the b station outputs a signal which is sent from a tributary side and which is received by the INF 3 to both of the INFs 1 and 2. The switch fabric included in the transmission apparatus in the a station at the receiving end switches a switch for outputting the signals sent via the 0-system and 1-system lines to the INF 3.

Accordingly, if a failure occurs in the 0-system line which belongs to the currently used system, then the switch fabric included in the transmission apparatus installed in the a or b station switches the switch. By doing so, a signal is received from the 1-system line which belongs to the spare system, and the failure is dealt with.

FIG. 21 is a view for describing one-to-one line redundancy. The one-to-one line redundancy differs from the one-plus-one line redundancy shown in FIG. 20 in switch structure in a switch fabric. Only descriptions of the switch fabric will be given.

With the one-plus-one line redundancy, signals are sent from the INFs 1 and 2 which belong to the currently used system and the spare system, respectively, and a signal to be received is selected at the receiving end. With the one-to-one line redundancy, on the other hand, the switch fabric includes a switch so that the sending of a signal can also be selected at the sending end.

For example, a switch fabric included in a transmission apparatus installed in an a station receives a signal from a tributary side (INF 3) and outputs it only to an INF 1. If a failure occurs in a 0-system line, then the switch fabric switches a switch (indicated by BR in FIG. 21) for outputting the signal received from the INF 3 to an INF 2. In addition, the switch fabric switches a switch (indicated by SW in FIG. 21) to the INF 2 side so that it can receive a signal sent from a transmission apparatus installed in a b station. With the one-to-one line redundancy, the switches included in the switch fabric at the sending and receiving ends are switched in this way for dealing with the line failure.

FIG. 22 is a view for describing one-to-N line redundancy. Unlike the one-to-one line redundancy, a plurality of lines which belong to a currently used system are used in the case of the one-to-N line redundancy. In FIG. 22, for example, INFs 2 and 3 belong to a currently used system and there are two 0-system lines. If a failure occurs in one of the two 0-system lines, a switch fabric switches switches (indicated by SW and BR in FIG. 22) so that it can communicate via a 1-system line.

Unit redundancy will now be described. FIG. 23 is a view for describing one-plus-one unit redundancy. In FIG. 23, two transmission apparatus installed in a and b stations are shown. In FIG. 23, each of the two transmission apparatus includes only INFs 1 through 3, a switch fabric included in an STSSW 0, and an IFSW 0 as a result of simplifying the transmission apparatus shown in FIG. 19.

The IFSW 0 is a unit for dealing with a unit failure. For example, the INF 3 included in the transmission apparatus installed in the a station receives a signal sent from a line side. The switch fabric outputs the signal received by the INF 3 to both of the INFs 1 and 2 which belong to a currently used system and a spare system respectively. Switches included in the IFSW 0 select only the signal outputted to the INF 1 which belongs to the currently used system, and send the signal to the transmission apparatus installed in the b station. In addition, the IFSW 0 included in the transmission apparatus installed in the a station outputs a signal received from a tributary side to both of the INFs 1 and 2 which belong to the currently used system and the spare system respectively. Switches included in the switch fabric select the signal outputted to the INF 1 which belongs to the currently used system, and output the signal to the INF 3. The operation of the transmission apparatus installed in the b station is the same as that of the transmission apparatus installed in the a station.

It is assumed that a failure occurs in the INF 1 in the a station which belongs to the currently used system. The IFSWs 0 and the switch fabrics included in the transmission apparatus installed in the a and b stations switch the switches so that a signal will be sent or received by the INF 2 which belongs to the spare system. With the unit redundancy, a communication failure on the tributary side is dealt with.

FIG. 24 is a view for describing one-to-one unit redundancy. The one-to-one unit redundancy differs from the one-plus-one unit redundancy shown in FIG. 23 in switch structure in a switch fabric and an IFSW 0. Only descriptions of the switch fabric and the IFSW 0 will be given.

With the one-plus-one unit redundancy, the switch fabric outputs signals to INFs 1 and 2 which belong to a currently used system and a spare system, respectively, and the IFSW 0 selects a signal to be sent to the receiving end. With the one-to-one unit redundancy, on the other hand, the switch fabric includes a switch (indicated by BR in FIG. 24) so that the sending of a signal can also be selected at the sending end. In addition, the IFSW 0 includes a switch (indicated by BR in FIG. 24) so that it can output a signal it received to one of INFs 1 and 2.

For example, a switch fabric included in a transmission apparatus installed in an a station receives a signal sent from a line side by an INF 3 and outputs it only to an INF 1. An IFSW 0 outputs a signal it received from a transmission apparatus installed in a b station to the INF 1.

If a failure occurs in the INF 1, then the switch fabric switches the BR shown in FIG. 24 to the INF 2 which belongs to a spare system. The IFSW 0 switches SW to the INF 2 side so that a signal outputted from the INF 2 which belongs to the spare system will be sent to the transmission apparatus installed in the b station at the receiving end. In addition, the IFSW 0 switches the BR so that a signal sent from the transmission apparatus installed in the b station will be outputted to the INF 2. The switch fabric switches SW so that the signal sent from the INF 2 will be outputted to the INF 3.

With the one-to-one unit redundancy, switches included in a switch fabric and an IFSW 0 at the sending or receiving end are switched in this way to deal with a unit failure.

FIG. 25 is a view for describing one-to-N unit redundancy. Unlike the one-to-one unit redundancy, a plurality of INF units are used in the case of the one-to-N unit redundancy. In FIG. 25, for example, INFs 2 and 3 belong to a currently used system. If a failure occurs in one of the INFs 2 and 3 which belong to the currently used system, a switch fabric and an IFSW 0 switch SWs and BRs shown in FIG. 25 so that communication can be performed by using an INF 1 which belongs to a spare system.

Path redundancy will now be described. FIG. 26 is a view for describing path redundancy in a UPSR. In FIG. 26, four transmission apparatus installed in a, b, c, and d stations are shown. In FIG. 26, each of the four transmission apparatus includes only INFs 1 through 3 and an STSSW 0 as a result of simplifying the transmission apparatus shown in FIG. 19. WESTs and EASTs shown in FIG. 26 indicate INFs which make up a ring network.

With the path redundancy in a uni-direction protection switched ring (UPSR), the same signal is sent via paths which belong to a currently used system and a spare system. One signal is selected and received at the receiving end. For example, it is assumed that the transmission apparatus installed in the c station receives a signal sent from a tributary side by an INF 3. An STSSW 0 included in the transmission apparatus installed in the c station sends the signal received by the INF 3 from both of INFs 1 and 2 with a cross connect. Cross connects in STSSWs 0 included in the transmission apparatus installed in the b and d stations are set so that the signals received from the c station will pass through the STSSWs 0. A cross connect in an STSSW 0 included in the transmission apparatus installed in the a station is set so that the STSSW 0 will receive only the signal sent from the b station and so that the STSSW 0 will output the signal to an INF 3. As a result, the route from the c station, through the b station, to the a station is a path which belongs to a currently used system, and the route from the c station, through the d station, to the a station is a path which belongs to a spare system. Therefore, if a failure occurs in the path between the b and a stations (indicated by a dotted-line circle in FIG. 26) along which a signal is sent, then the STSSW 0 included in the transmission apparatus installed in the a station receives a signal sent from the d station. By doing so, the path failure can be dealt with.

FIG. 27 is a view for describing path redundancy in a BLSR. With a bidirection line switched ring (BLSR), a path is divided into a currently used system and a spare system. With an OC(optical carrier level)-48 BLSR, 48 channels are divided into, for example, 1 through 24 channels and 25 through 48 channels as a currently used system and a spare system respectively. In FIG. 27, a solid arrow indicates 1 through 24 channels which belong to the currently used system, and a dotted-line arrow indicates 25 through 48 channels which belong to the spare system.

It is assumed that a transmission apparatus installed in a c station receives a signal sent from a tributary side by an INF 3. An STSSW 0 included in the transmission apparatus installed in the c station sends the signal received by the INF 3 from an INF 2 with a cross connect. A cross connects in an STSSW 0 included in a transmission apparatus installed in a b station is set so that the signal received from the c station will pass through the STSSW 0. A cross connect in an STSSW 0 included in a transmission apparatus installed in an a station is set so that the STSSW 0 will receive the signal sent from the b station and so that the STSSW 0 will output the signal to an INF 3.

If a failure occurs in the path between the b and a stations (dotted-line circle in FIG. 27) along which a signal is sent, then the STSSW 0 included in the transmission apparatus installed in the b station makes a signal sent from the c station turn back to the c station by using a path which belongs to the spare system. The STSSW 0 included in the transmission apparatus installed in the c station sends the signal sent from the b station to the d station. The d station sends the signal sent from the c station to the a station. By doing so, the path failure can be dealt with.

Operation which is performed if a failure occurs will now be described in detail. FIG. 28 is a view for describing the details of the one-to-one line redundancy. In FIG. 28, the structure of the transmission apparatus in the a station shown in FIG. 21 is shown. INFs 1a and 1b correspond to an optical/electrical (O/E) converter and an E/O converter, respectively, included in the INF 1 and the INFs 1a and 1b make up the INF 1. Similarly, INFs 2a and 2b correspond to an O/E converter and an E/O converter, respectively, included in the INF 2 and INFs 3a and 3b correspond to an O/E converter and an E/O converter, respectively, included in the INF 3. An STSSW 0 includes switch fabrics 111a and 111b, ring switches 112a and 112b, and a cross connect 113.

A solid arrow A101 in FIG. 28 indicates a signal route in the transmission apparatus in the a station in FIG. 21 which is used if a failure does not occur. A dotted-line arrow A102 in FIG. 28 indicates a signal route in the transmission apparatus in the a station in FIG. 21 which is used if a failure occurs. With the line redundancy, the settings of the ring switches 112a and 112b and the cross connect 113 are not changed. By switching switches included in the switch fabrics 111a and 111b, a signal route is switched from the 0 system which is the currently used system to the 1 system which is the spare system. The same applies to the one-plus-one line redundancy and the one-to-N line redundancy. That is to say, by switching switches included in switch fabrics 111a and 111b, a signal route is switched from the 0 system which is the currently used system to the 1 system which is the spare system.

FIG. 29 is a view for describing the details of the one-plus-one unit redundancy. In FIG. 29, the structure of the transmission apparatus installed in the a station shown in FIG. 23 is shown. Components in FIG. 29 that are the same as those shown in FIG. 28 are marked with the same symbols and descriptions of them will be omitted.

IFSWs 0a and 0b shown in FIG. 29 correspond to the IFSW 0 shown in FIG. 23. As described in FIG. 23, the IFSW 0a outputs a signal sent from the b station to both of the INFs 1 and 2 (INFs 1a and 2a). A switch fabric 111a outputs the signal outputted from the INF 1a which belongs to a currently used system to an INF 3b via a cross connect 113. A signal received by an INF 3a is outputted to both of INFs 1b and 2b by a switch fabric 111b and is outputted to the IFSW 0b. The IFSW 0b selects the signal outputted from the INF 1b and outputs it to the tributary side (b station).

If a failure occurs in the INF 1, then the switch fabric 111a selects a signal outputted from the INF 2a (shown by a dotted-line arrow A111) and outputs the signal to the INF 3b. In addition, the IFSW 0b selects a signal outputted from the INF 2b (shown by a dotted-line arrow A112) and outputs the signal to the tributary side. With the unit redundancy, the settings of ring switches 112a and 112b and a cross connect 113 are not changed. By switching switches included in the switch fabrics 111a and 111b and the IFSWs 0a and 0b, a unit is switched from the INF 1 which belongs to a currently used system to the INF 2 which belongs to a spare system. The same applies to the one-to-one unit redundancy and the one-to-N unit redundancy. That is to say, by switching switches included in switch fabrics 111a and 111b and IFSWs 0a and 0b, a unit is switched from an INF 1 which belongs to a currently used system to an INF 2 which belongs to a spare system.

FIG. 30 is a view for describing the details of the path redundancy in a UPSR. In FIG. 30, the structure of the transmission apparatus in the a station shown in FIG. 26 is shown. Components in FIG. 30 that are the same as those shown in FIG. 28 are marked with the same symbols and descriptions of them will be omitted.

A cross connect 113 shown in FIG. 30 outputs a signal which is sent from a tributary side and which is received by an INF 3a to INFs 1b and 2b. As a result, the signal received by the INF 3a is outputted from both of the EAST and WEST sides shown in FIG. 26. Of signals sent to both of INFs 1a and 2a, the cross connect 113 outputs only the signal sent to the INF 1a to an INF 3b. This signal is outputted to a tributary side.

If a path failure occurs as shown by the dotted-line circle in FIG. 26, then the cross connect 113 outputs a signal sent to the INF 2a to the INF 3b (shown by a dotted-line arrow A121). By doing so, the path failure can be dealt with.

An SDH transmission method and apparatus in which circuits in a cross connect and a path protection are simplified by controlling a read address with the same dual port random access memory (RAM) are disclosed (see, for example, Japanese Patent Laid-Open Publication No. 2005-45573). Furthermore, a method for performing cross-connecting by selecting line setting information used for a path switch service selector and by using this information is disclosed (see, for example, Japanese Patent Laid-Open Publication No. 2000-197167).

By the way, an STSSW 0 includes a plurality of switches so that various redundancy requests (line redundancy, unit redundancy, and path redundancy) made by users can be handled. Accordingly, there are unnecessary switches, depending on the type of redundancy. As shown in FIG. 30, for example, when a request for path redundancy is made to the transmission apparatus, switches included in switch fabrics 111a and 111b and ring switches 112a and 112b are not switched. Therefore, these switches are unnecessary.

SUMMARY OF THE INVENTION

The present invention was made under the background circumstances described above. An object of the present invention is to provide a transmission apparatus which does not include a plurality of switches and which can handle various redundancy requests made by a user.

In order to achieve the above object, there is provided a transmission apparatus for cross-connecting a signal, comprising an address information generation section for generating address information indicative of destinations of the signal in a currently used system and a spare system from redundancy setting information regarding the setting of the currently used system and the spare system and cross connect setting information for cross-connecting the signal, an address information storage section for storing the address information, an activation information setting section for activating and deactivating activation information included in the address information stored in the address information storage section according to failure, an address information insertion section for inserting the address information stored in the address information storage section into the signal and for outputting the signal to a bus, and a signal output section for receiving the signal in which the address information is the same as address information set in advance from the bus and for outputting, in the case of the activation information indicating activation, the signal to a next stage.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
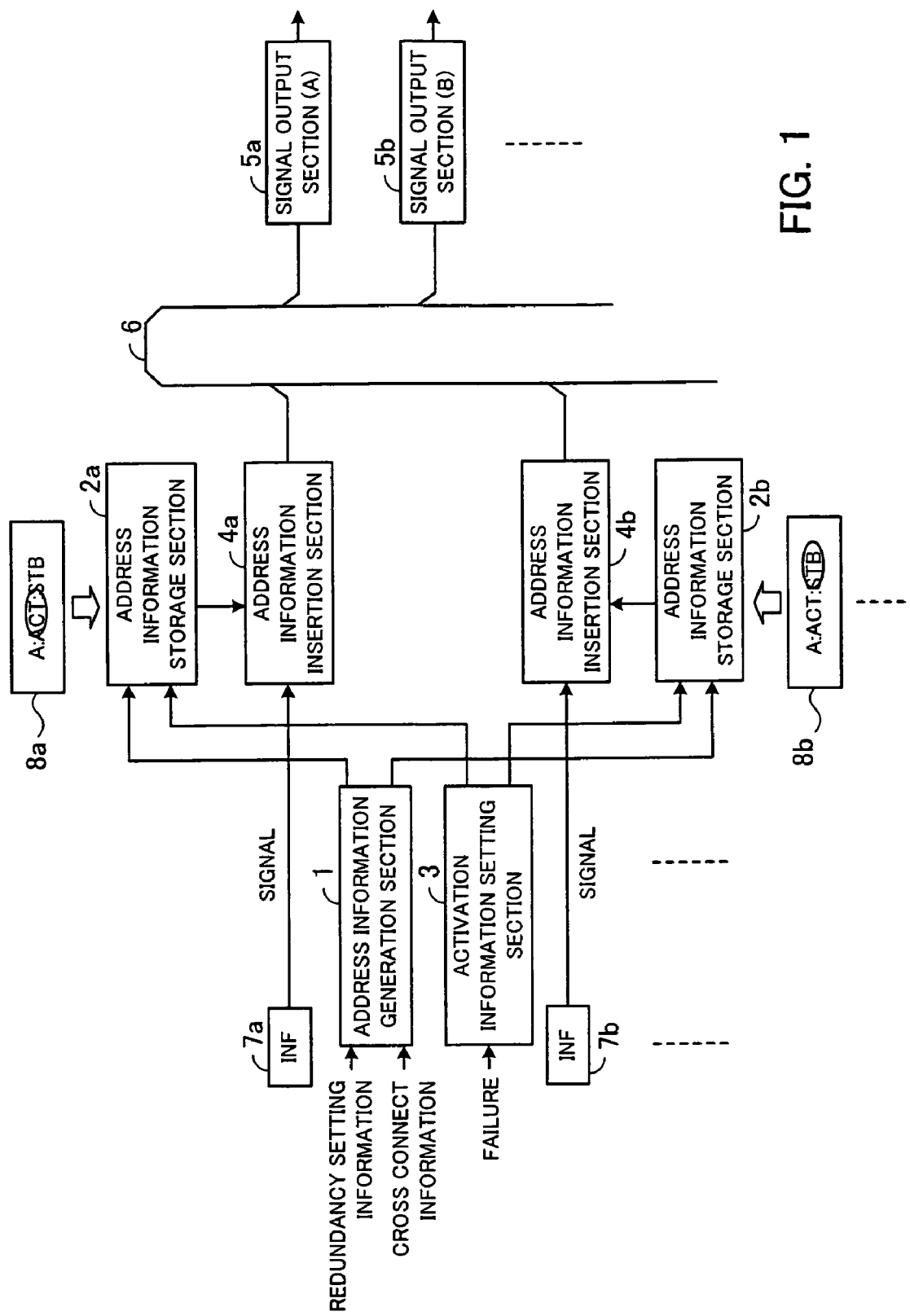
FIG. 1 gives an overview of a transmission apparatus.

The principles underlying the present invention will now be described in detail with reference to the drawing.

FIG. 1 gives an overview of a transmission apparatus. As shown in FIG. 1, a transmission apparatus comprises an address information generation section 1, address information storage sections 2a and 2b, an activation information setting section 3, address information insertion sections 4a and 4b, signal output sections 5a and 5b, a bus 6, and INFs 7a and 7b.

Redundancy setting information and cross connect information are inputted to the address information generation section 1. The redundancy setting information is indicative of the setting of a line, a unit, or a path as a currently used system or a spare system. For example, the redundancy setting information is indicative of the setting of the INFs 7a and 7b which are units as the currently used system and the spare system respectively. The cross connect information is indicative of which of the signal output sections 5a and 5b an input signal is outputted to. For example, the cross connect information indicates that a signal outputted from the INF 7a set as the currently used system is outputted to the signal output section 5a the address of which is A. These pieces of information are set by a user.

The address information generation section 1 generates address information indicative of destinations in the currently used system and the spare system of a signal from the redundancy setting information and the cross connect information. For example, if the above redundancy setting information and cross connect information are inputted to the address information generation section 1, then the address information generation section 1 generates address information including A as the address of the destination of a signal outputted from the INF 7a set as the currently used system. The address information generation section 1 also generates address information including A as the address of the destination of a signal outputted from the INF 7b set as the spare system. The address information includes activation information. The activation information included in the address information for the currently used system indicates activation and the activation information included in the address information for the spare system indicates deactivation.

The address information generated by the address information generation section 1 is stored in the address information storage sections 2a and 2b. If the above redundancy setting information and cross connect information, for example, are inputted to the address information generation section 1, then address information 8a including the address A and the activation information which indicates that the address information is in an activated state (ACT is enclosed with a circle) is stored in the address information storage section 2a. If the above redundancy setting information and cross connect information are inputted to the address information generation section 1, then address information 8b including the address A and the activation information which indicates that the address information is in a deactivated state (STB is enclosed with a circle) is stored in the address information storage section 2b as shown in FIG. 1.

The address information insertion section 4a inserts the address information stored in the address information storage section 2a into the signal and outputs the signal to the bus 6. The address information insertion section 4b inserts the address information stored in the address information storage section 2b into the signal and outputs the signal to the bus 6.

The address information is set in advance in the signal output sections 5a and 5b. For example, it is assumed that the addresses A and B are set in advance in the signal output sections 5a and 5b respectively. Each of the signal output sections 5a and 5b receives a signal including address information that is the same as address information set therein from the bus 6. If activation information included in the address information indicates activation, then each of the signal output sections 5a and 5b outputs the signal it received to the next stage.

The activation information setting section 3 activates or deactivates the activation information included in the address information 8a and 8b stored in the address information storage sections 2a and 2b, respectively, according to failure.

For example, it is assumed that the INF 7a set as the currently used system is normal. The address information 8a is inserted into the signal outputted from the INF 7a. The address included in the address information 8a is A, so the signal is received by the signal output section 5a. The activation information included in the address information 8a indicates activation, so the signal output section 5a outputs the signal it received to the next stage.

The address information 8b is inserted into the signal outputted from the INF 7b set as the spare system. The address included in the address information 8b is A, so the signal is received by the signal output section 5a. The activation information included in the address information 8b indicates deactivation, so the signal output section 5a does not output the signal it received to the next stage.

If a failure occurs in the INF 7a, the activation information setting section 3 deactivates the activation information included in the address information 8a stored in the address information storage section 2a (changes the activation information to STB). In addition, the activation information setting section 3 activates the activation information included in the address information 8b stored in the address information storage section 2b (changes the activation information to ACT). As a result, the signal outputted from the INF 7b set as the spare system is received by the signal output section 5a and is outputted to the next stage. That is to say, the failure which occurs in the INF 7a is overcome by using the INF 7b.

As stated above, the transmission apparatus does not include a plurality of switches, cross-connects a signal, and can handle various redundancy requests made by a user.

Embodiments of the present invention will now be described in detail with reference to the drawings.

Figure 2:
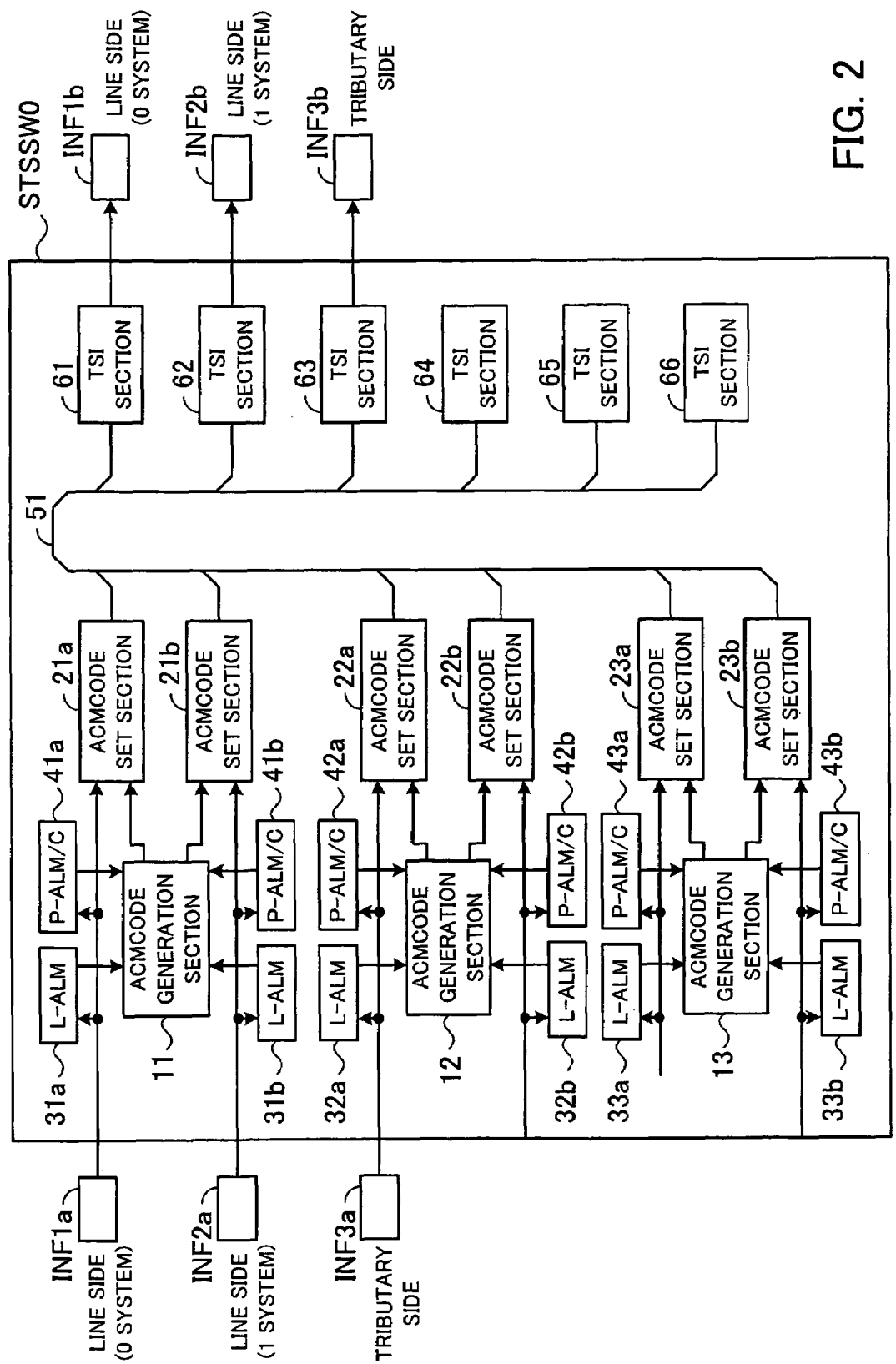
FIG. 2 shows an example of the structure of transmission apparatus hardware.

FIG. 2 shows an example of the structure of transmission apparatus hardware. As shown in FIG. 2, a transmission apparatus comprises INFs 1a, 2a, 3a, 1b, 2b, and 3b, and an STSSW 0. The INFs 1a and 1b correspond to an O/E converter and an E/O converter, respectively, included in an INF 1 and make up the INF 1. Similarly, the INFs 2a and 2b correspond to an O/E converter and an E/O converter, respectively, included in an INF 2 and make up the INF 2. The INFs 3a and 3b correspond to an O/E converter and an E/O converter, respectively, included in an INF 3 and make up the INF 3.

The STSSW 0 includes address column memory data (ACM) CODE generation sections 11 through 13. In addition, the STSSW 0 includes ACMCODE set sections 21a and 21b, ACMCODE set sections 22a and 22b, and ACMCODE set sections 23a and 23b corresponding to the ACMCODE generation sections 11 through 13 respectively. The STSSW 0 also includes an L-ALM 31a and a P-ALM/C 41a, an L-ALM 31b and a P-ALM/C 41b, an L-ALM 32a and a P-ALM/C 42a, an L-ALM 32b and a P-ALM/C 42b, an L-ALM 33a and a P-ALM/C 43a, and an L-ALM 33b and a P-ALM/C 43b corresponding to the ACMCODE set sections 21a and 21b, the ACMCODE set sections 22a and 22b, and the ACMCODE set sections 23a and 23b respectively.

In addition, the STSSW 0 includes TSI sections 61 through 66. The TSI sections 61 through 66 are connected to the ACMCODE set sections 21a and 21b, the ACMCODE set sections 22a and 22b, and the ACMCODE set sections 23a and 23b via a bus 51.

INF units, lines connected to the INF units, paths, and the like set as a currently used system and a spare system are included in case of failure. Each of the ACMCODE generation sections 11 through 13 monitors two INF units to select the currently used system or the spare system according to failure.

Figure 20:
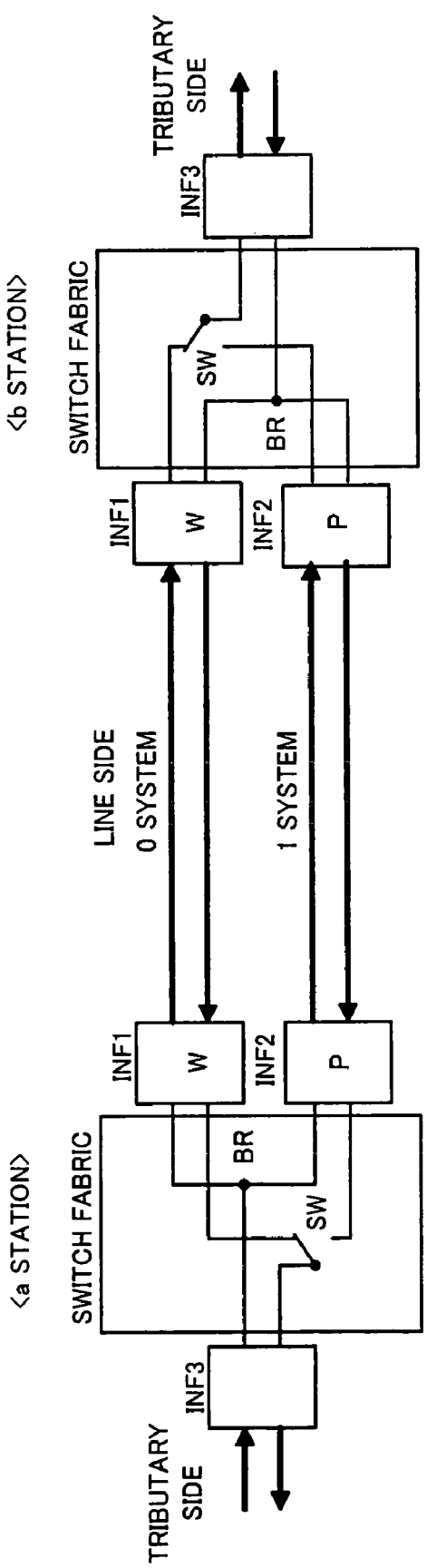
FIG. 20 is a view for describing one-plus-one line redundancy.

For example, it is assumed that the INFs 1 and 2 are set as the currently used system and the spare system, respectively, in FIG. 2. Then the ACMCODE generation section 11 monitors the INFs 1 and 2. A spare system for the INF 3 is unnecessary (for example, a spare for the INF 3 is unnecessary in line information in FIG. 20 described before), so the ACMCODE generation section 12 monitors the INF 3.

In FIG. 2, only the INFs 1 through 3 are included and the ACMCODE generation section 13 is unused. The number of ACMCODE generation sections, ACMCODE setting sections, L-ALMs, P-ALM/C's, and TSI sections can be increased or decreased according to the number of INF units.

Figure 3:
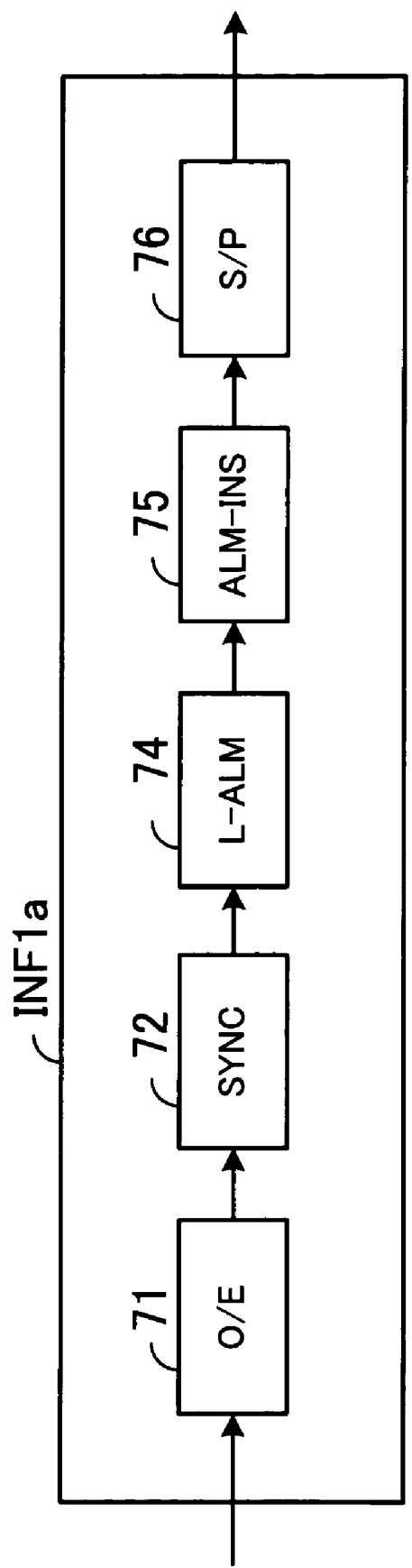
FIG. 3 shows the details of an O/E converter included in an INF.
Figure 19:
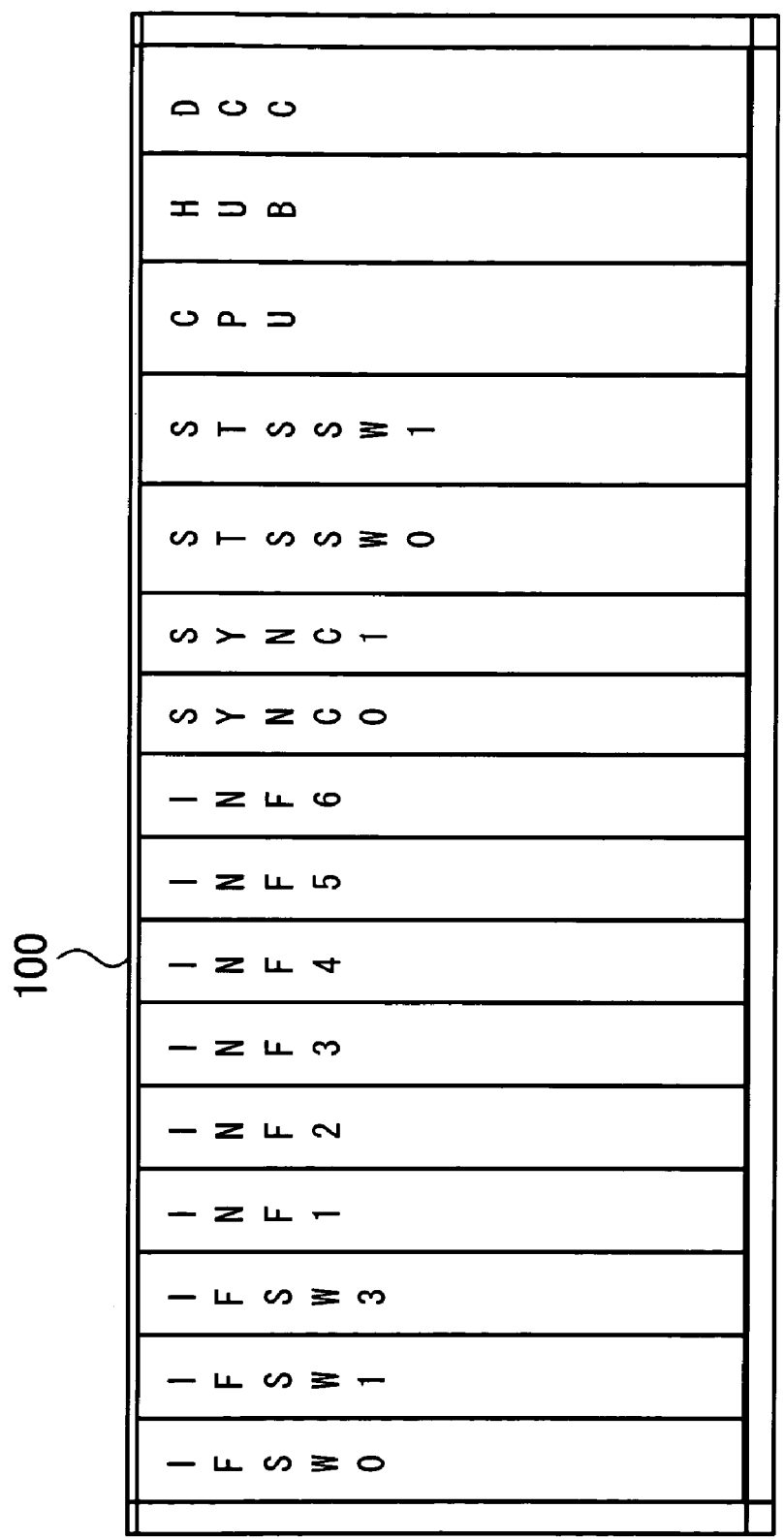
FIG. 19 shows an example of mounting units in a transmission apparatus.

Each component shown in FIG. 2 will now be described in detail. FIG. 3 shows the details of an O/E converter included in an INF. In FIG. 3, the details of the INF 1a shown in FIG. 2 are shown. An O/E 71 included in the INF 1a converts an input optical signal into an electrical signal. A SYNC 72 synchronizes the electrical signal by a synchronizing signal sent from the SYNC 1 unit shown in FIG. 19. An L-ALM 74 detects a pullout or the like of the electrical signal outputted from the SYNC 72 to detect a line failure. An ALM-INS 75 inserts an alarm indicative of the line failure detected by the L-ALM 74 into A1 bytes of a main signal. An S/P 76 converts serial electrical signals into parallel electrical signals.

The alarm which indicates the line failure and which is inserted into the A1 bytes is detected by the L-ALM 31a shown in FIG. 2 and is outputted to the ACMCODE generation section 11 as a line alarm. For example, the alarm indicative of the line failure may be loss of signal (LOS), loss of frame (LOF), a line-alarm indication signal (L-AIS), a trace identifier mismatch (TIM), or B2 error data generated major (B2 ERR MAJ).

The structure of the INFs 2a and 3a is the same as that of the INF 1a, so descriptions of them will be omitted.

Figure 4:
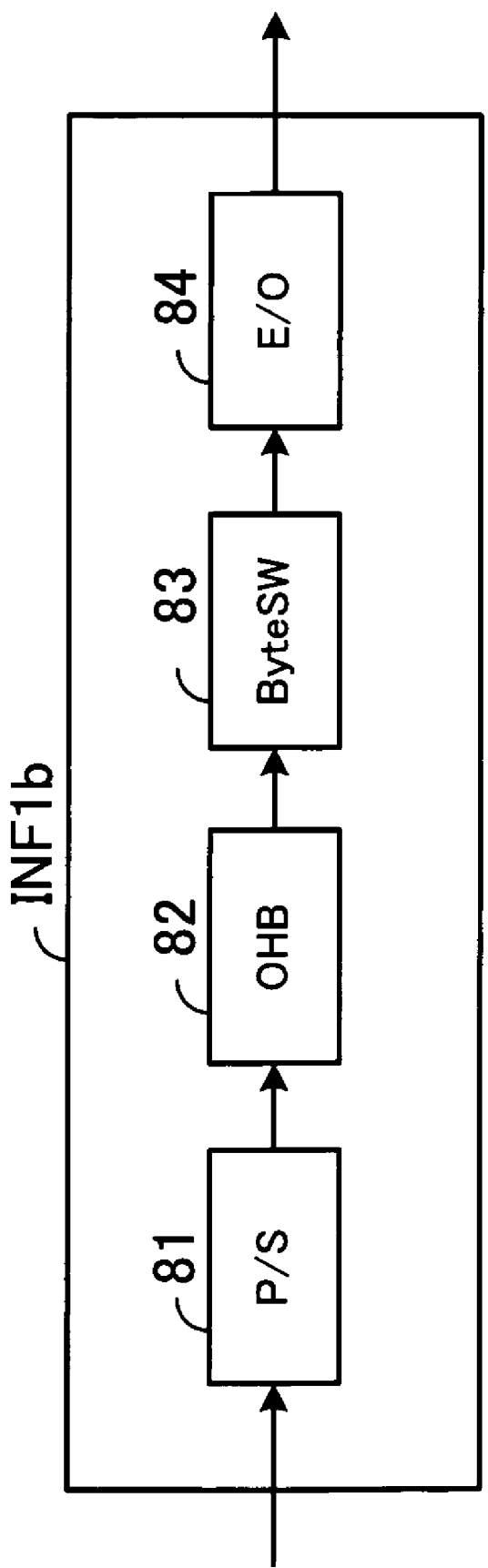
FIG. 4 shows the details of an E/O converter included in an INF.

FIG. 4 shows the details of an E/O converter included in an INF. In FIG. 4, the details of the INF 1b shown in FIG. 2 are shown. A P/S 81 included in the INF 1b converts parallel electrical signals outputted from the STSSW 0 into serial electrical signals. If the alarm indicative of the line failure is generated, an OHB 82 inserts a signal for giving a transmission apparatus at the other end instructions to select the spare line into an overhead of the main signal. A ByteSW 83 changes the order of the electrical signals. An E/O 84 converts the electrical signals into optical signals and outputs them.

Figure 5:
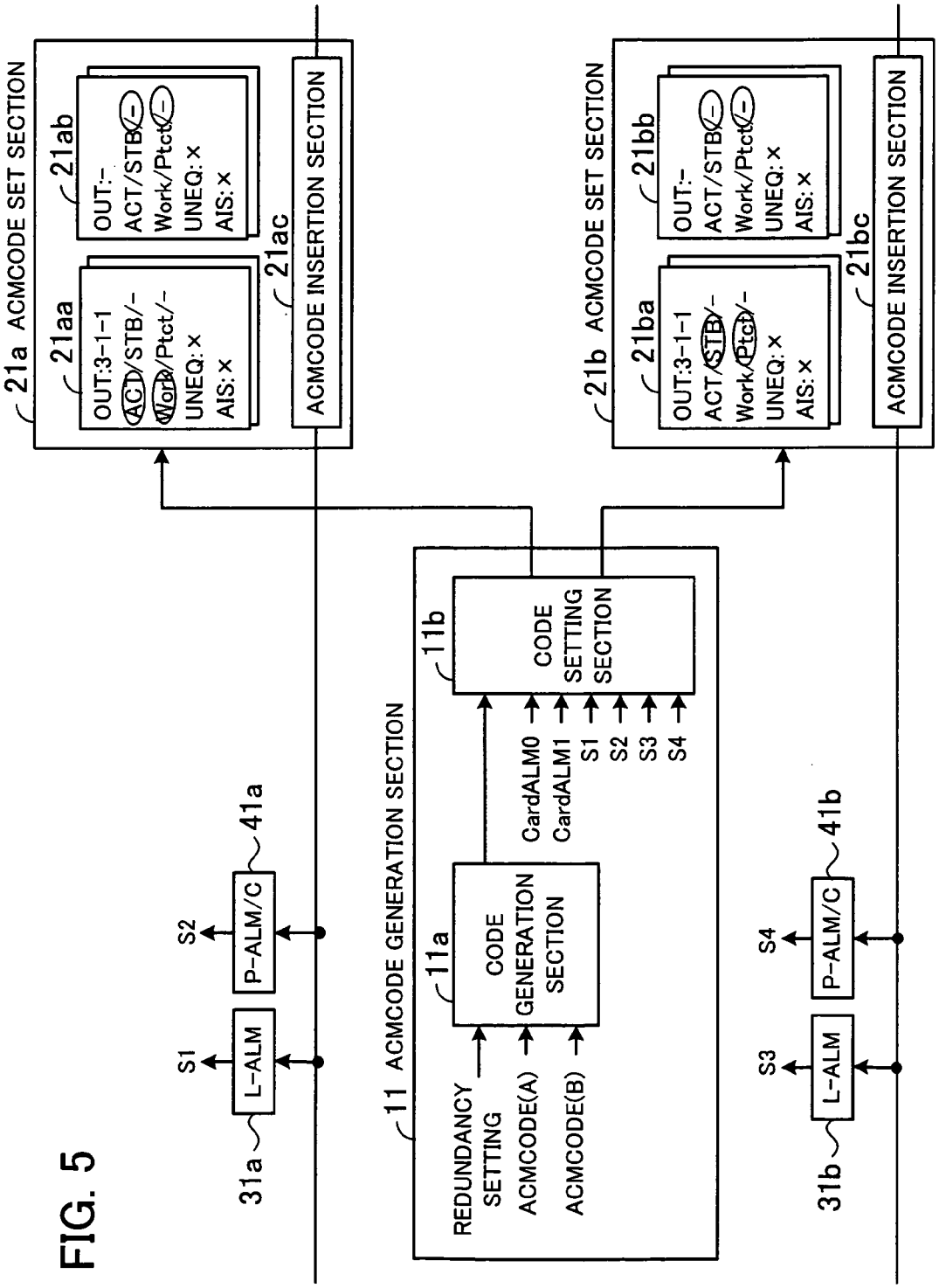
FIG. 5 shows the details of an ACMCODE generation section and an ACMCODE setting section.

FIG. 5 shows the details of an ACMCODE generation section and an ACMCODE setting section. In FIG. 5, the ACMCODE generation section 11, the ACMCODE set sections 21a and 21b, the L-ALMs 31a and 31b, and the P-ALM/C's 41a and 41b shown in FIG. 2 are shown.

The ACMCODE generation section 11 includes a CODE generation section 11a and a CODE setting section 11b. A redundancy setting is inputted to the CODE generation section 11a. For example, a redundancy setting may mean a line redundancy setting by which lines connected to the INFs 1 and 2 are set as the currently used system (0 system) and the spare system (1 system) respectively, mean a unit redundancy setting by which the INFs 1 and 2 are set as units included in the currently used system and the spare system respectively, or mean a path redundancy setting by which paths connected to the INFs 1 and 2 are set as the currently used system and the spare system respectively.

ACMCODEs (A) and (B) are also inputted to the CODE generation section 11*a*. Each of the ACMCODEs (A) and (B) is line design information indicative of the destination of an input signal (address to which an input signal is to be cross-connected). To be concrete, each of the ACMCODEs (A) and (B) is indicated by STSxx:a-b-c→d-e-f. "STSxx" is a signal level and STS1, STS3C, STS12C, STS48C, or the like is set. "a-b-c" is a path on the input side of the signal and "d-e-f" is a path on the output side of the signal.

"a" and "d" indicate slots into which INFs are mounted. To simplify description, it is assumed that the number of a slot coincides with the number of an INF mounted into the slot. For example, the slot number "1" indicates the INF 1. "b" and "e" indicate the number of lines. They are used if a plurality of lines are connected to one unit. In the following description, the number of lines is one (values of "b" and "e" are one). "c" and "f" indicate the number of paths for STS1 which is a unit.

The above redundancy setting and ACMCODEs (A) and (B) are set with, for example, a microcomputer.

The CODE generation section 11*a* generates one or two ACMCODEs for the INF 1 which are used when normal operation is performed and when a failure occurs and one or two ACMCODEs for the INF 2 which are used when the normal operation is performed and when the failure occurs on the basis of the redundancy setting and the ACMCODEs (A) and (B) inputted.

For example, the CODE generation section 11*a* generates an ACMCODE, such as "OUT:3-1-1" shown in a register 21*aa* included in the ACMCODE set section 21*a*, indicative of an address to which a signal is to be cross-connected on the basis of the redundancy setting and the ACMCODEs (A) and (B) inputted. "OUT:3-1-1" indicates that a signal inputted to an ACMCODE insertion section 21*ac* (signal outputted from the INF 1) is outputted to a path 1 on a line 1 of the INF 3. In addition, the CODE generation section 11*a* generates, for example, information indicative of which of the currently used system (Work) and the spare system (Ptct) the INFs 1 and 2 belong to.

The CODE setting section 11*b* writes information including the ACMCODEs for the INF 1 generated by the CODE generation section 11*a* to the register 21*aa* and a register 21*ab* included in the ACMCODE set section 21*a*. The CODE setting section 11*b* also writes information including the ACMCODEs for the INF 2 to registers 21*ba* and 21*bb* included in the ACMCODE set section 21*b*.

CardALMs 0 and 1 and alarm signals S1 through S4 are inputted to the CODE setting section 11*b*. Each of the CardALMs 0 and 1 is an alarm indicative of a unit failure. The unit failure is detected by the CPU unit shown in FIG. 19. Accordingly, the CardALMs 0 and 1 are outputted from the CPU unit. The CardALM 0 is an alarm about the INF 1 and the CardALM1 is an alarm about the INF 2. In addition, the alarm signals S1 through S4 each of which indicates a line failure and which are outputted from the L-ALM 31*a*, the P-ALM/C 41*a*, the L-ALM 31*b*, and the P-ALM/C 41*b*, respectively, are inputted to the CODE setting section 11*b*.

The CODE setting section 11*b* puts the information stored in the register 21*aa*, 21*ab*, 21*ba*, or 21*bb* into an active state (ACT) or a standby state (STB) on the basis of the CardALMs 0 and 1 and the alarm signals S1 through S4 inputted.

The ACMCODE set section 21*a* includes the registers 21*aa* and 21*ab* and the ACMCODE insertion section 21*ac*. The ACMCODE insertion section 21*ac* inserts the contents of the registers 21*aa* and 21*ab* into A1, A2, B1, and E1 bytes of a main signal outputted from the INF 1. The ACMCODE set section 21*b* includes the registers 21*ba* and 21*bb* and an ACMCODE insertion section 21*bc*. The ACMCODE insertion section 21*bc* inserts the contents of the registers 21*ba* and 21*bb* into A1, A2, B1, and E1 bytes of a main signal outputted from the INF 2.

Figure 6:
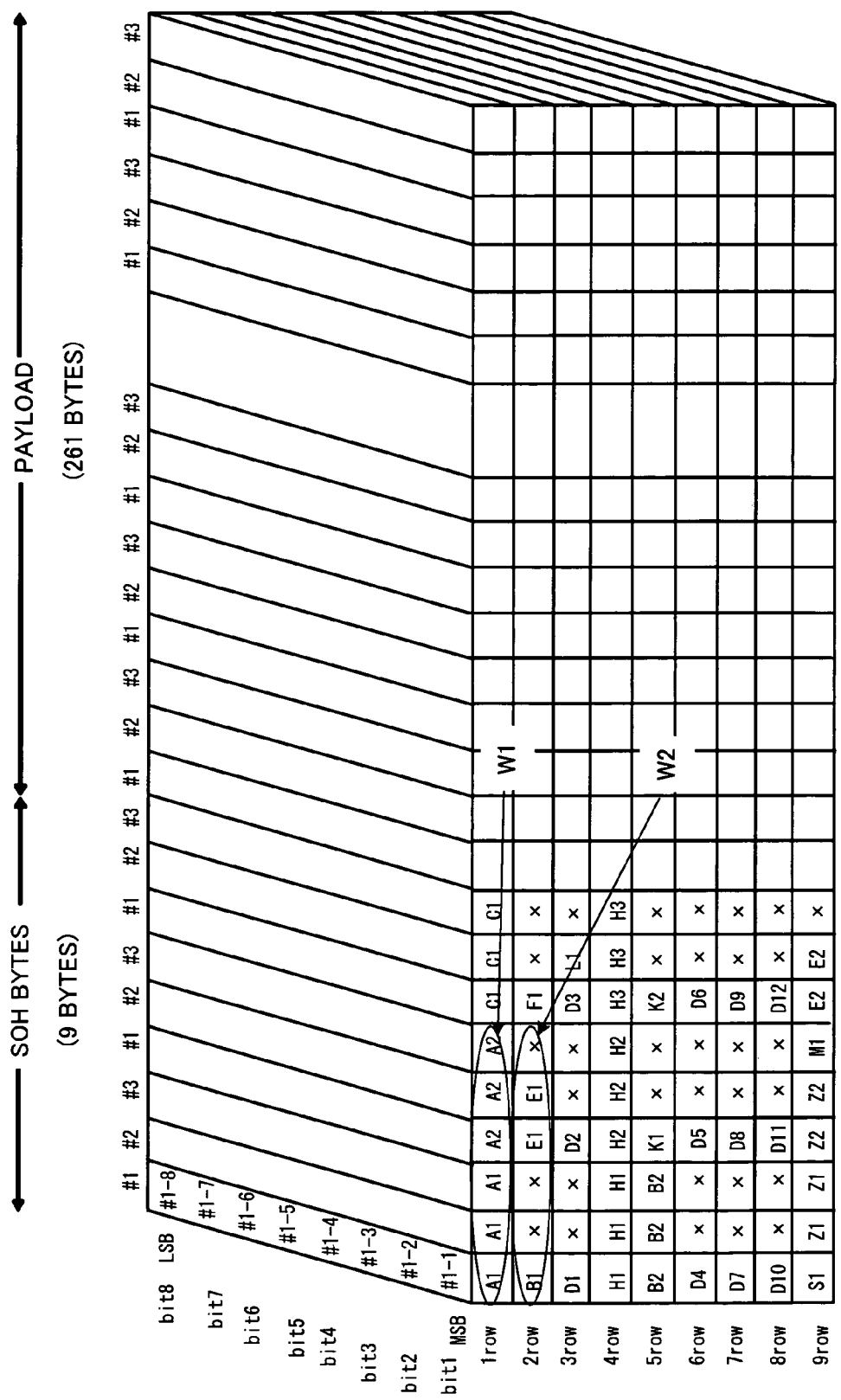
FIG. 6 shows the format of an STS-3 frame.

Descriptions of the A1, A2, B1, and E1 bytes will be given. FIG. 6 shows the format of an STS-3 frame. The information in, for example, the registers 21*aa* and 21*ba* is stored in an area in FIG. 6 indicated by the arrow W1. The information in, for example, the registers 21*ab* and 21*bb* is stored in an area in FIG. 6 indicated by the arrow W2. The registers 21*aa* and 21*ab* shown in FIG. 5 are also referred to as an ACMCODE A plane. The registers 21*ba* and 21*bb* shown in FIG. 5 are also referred to as an ACMCODE B plane.

Descriptions of FIG. 5 will now be given again. The ACMCODE, such as "OUT:3-1-1," is stored in the register 21*aa* by the CODE setting section 11*b*. Whether the ACMCODE is in the ACT or in the STB is set in the register 21*aa* by the CODE setting section 11*b*. In addition, whether the INF 1 is Work or Ptct (whether the INF 1 belongs to the currently used system or the spare system) is set in the register 21*aa*. Moreover, whether to output a UNEQ (unequipped) is set in the register 21*aa*. The UNEQ is a signal outputted in the case of cross-connecting not being performed. Whether to output an alarm indication signal (AIS) is also set in the register 21*aa*. "-" indicates that setting is not performed. This means a state in which the ACMCODE is not set, a state which is not the ACT or the STB, or a state which is not Work or Ptct. The same information that is stored in the register 21*aa* is set in the registers 21*ab*, 21*ba*, and 21*bb*.

In FIG. 5, for example, the ACMCODE stored in the register 21*aa* is in an active state and the INF 1 belongs to the currently used system (these are indicated by circles in FIG. 5). An ACMCODE stored in the register 21*ba* is in a standby state and the INF 2 belongs to the spare system.

It is assumed that a line failure occurs, that the alarm signals S1 through S4 are inputted to the CODE setting section 11*b*, and that a line switches from a 0 system (INF 1) to a 1 system (INF 2). Then the CODE setting section 11*b* puts the ACMCODE stored in the register 21*aa* into a standby state and stitches the INF 1 to the spare system (in the example shown in FIG. 5, "STB" in the register 21*aa* is enclosed with a circle). In addition, the CODE setting section 11*b* puts the ACMCODE stored in the register 21*ba* into an active state and stitches the INF 2 to the currently used system (in the example shown in FIG. 5, "ACT" in the register 21*ba* is enclosed with a circle).

There may be a plurality of registers 21*aa*, a plurality of registers 21*ab*, a plurality of registers 21*ba*, and a plurality of registers 21*bb*. In the case of OC48, for example, there are forty-eight registers 21*aa*, forty-eight registers 21*ab*, forty-eight registers 21*ba*, and forty-eight registers 21*bb* (for example, forty-eight registers for storing OUT:3-1-1 through OUT:3-1-48 are included).

The structure of the ACMCODE generation sections 12 and 13 shown in FIG. 2 is the same as that of the ACMCODE generation section 11 shown in FIG. 5, and the structure of the ACMCODE set sections 22*a*, 22*b*, 23*a*, and 23*b* shown in FIG. 2 is the same as that of the ACMCODE set sections 21*a* and 21*b* shown in FIG. 5. Accordingly, descriptions of them will be omitted.

Figure 7:
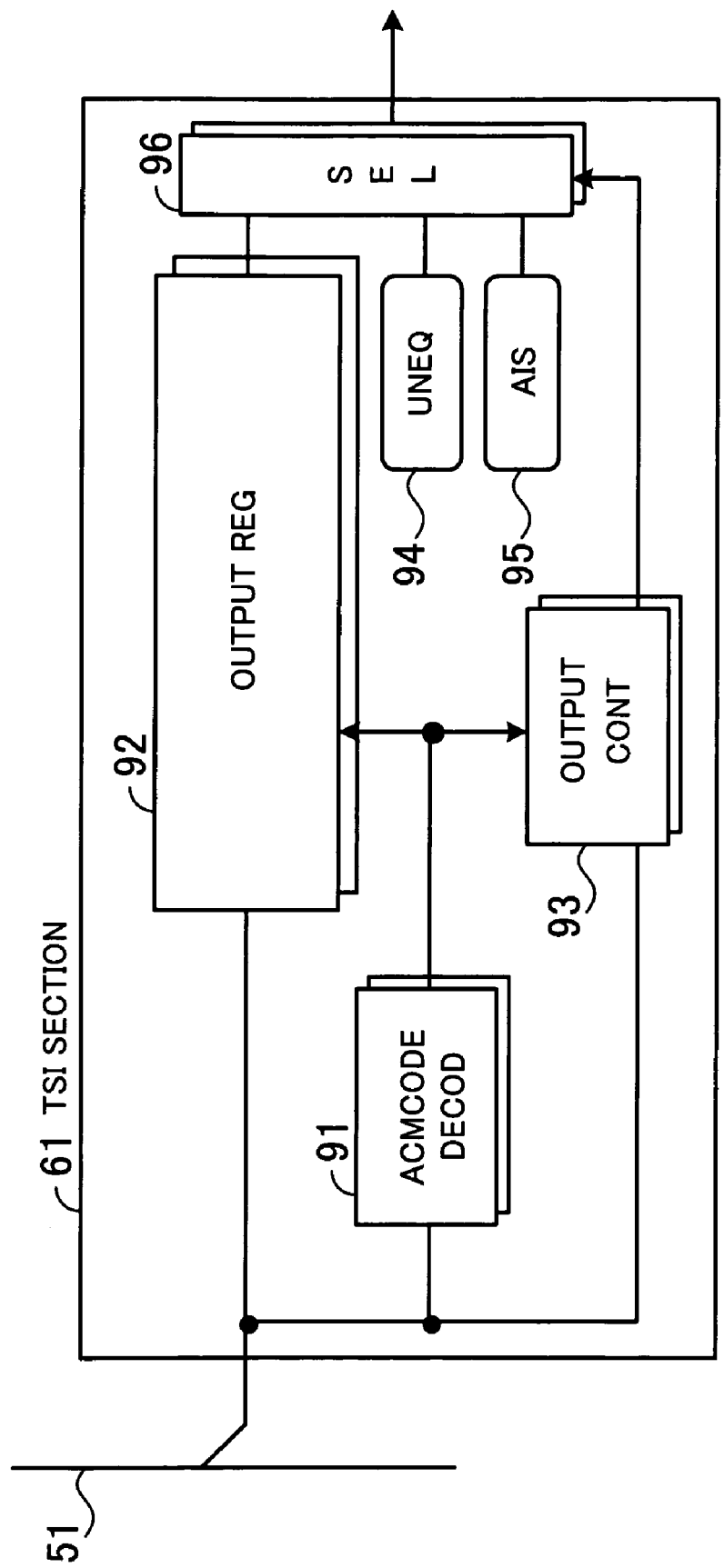
FIG. 7 shows the details of a TSI section.

The TSI section 61 shown in FIG. 2 will now be described in detail. FIG. 7 shows the details of the TSI section. As shown in FIG. 7, the TSI section 61 include an ACMCODEDECOD 91, an OUTPUTREG 92, an OUTPUTCONT 93, a UNEQ 94, an AIS 95, and a SEL 96.

An address (address to which a signal is to be cross-connected) is set in the ACMCODEDECOD 91 by, for example, a microcomputer. For example, the value a-b-c is set in the ACMCODEDECOD 91. "a," "b," and "c" are numbers and the value 1-1-1, for example, is set. "a" indicates a slot into which an INF unit is mounted, "b" indicates the number of lines, and "c" indicates the number of paths for STS1 which is a unit. In the case of OC48, forty-eight ACMCODEDECODs 91 are included.

As described in FIG. 5, the ACMCODE insertion sections 21ac and 21bc inserts the values stored in the registers 21aa, 21ab, 21ba, and 21bb into the main signals which run through the bus 51. If an ACMCODE (OUT:1-1-1, for example) included in a main signal matches the address set in the ACMCODEDECOD 91, then the ACMCODEDECOD 91 outputs a trigger signal to the OUTPUTREG 92 and the OUTPUTCONT 93.

When the trigger signal is outputted from the ACMCODEDECOD 91, the OUTPUTREG 92 introduces the main signal which runs through the bus 51 thereinto. The OUTPUTCONT 93 introduces status information (contents of the registers 21aa, 21ab, 21ba, and 21bb shown in FIG. 5) thereinto. The OUTPUTCONT 93 controls the SEL 96 on the basis of the status information to output the main signal introduced into the OUTPUTREG 92, a UNEQ signal outputted from the UNEQ 94, or an AIS signal outputted from the AIS 95 to the INF 1b.

For example, if the status information is ACT, then the OUTPUTCONT 93 makes the SEL 96 output the main signal introduced into the OUTPUTREG 92. If the status information is STB, then the OUTPUTCONT 93 makes the SEL 96 output a UNEQ signal outputted from the UNEQ 94.

The structure of the TSI sections 62 through 66 is the same as that of the TSI section 61. However, a unique address is set in an ACMCODEDECOD included in each of the TSI sections 62 through 66.

Operation performed in FIG. 2 in the case of line redundancy will now be described. Operation performed in the case of a line being normal will be described first.

Figure 8:
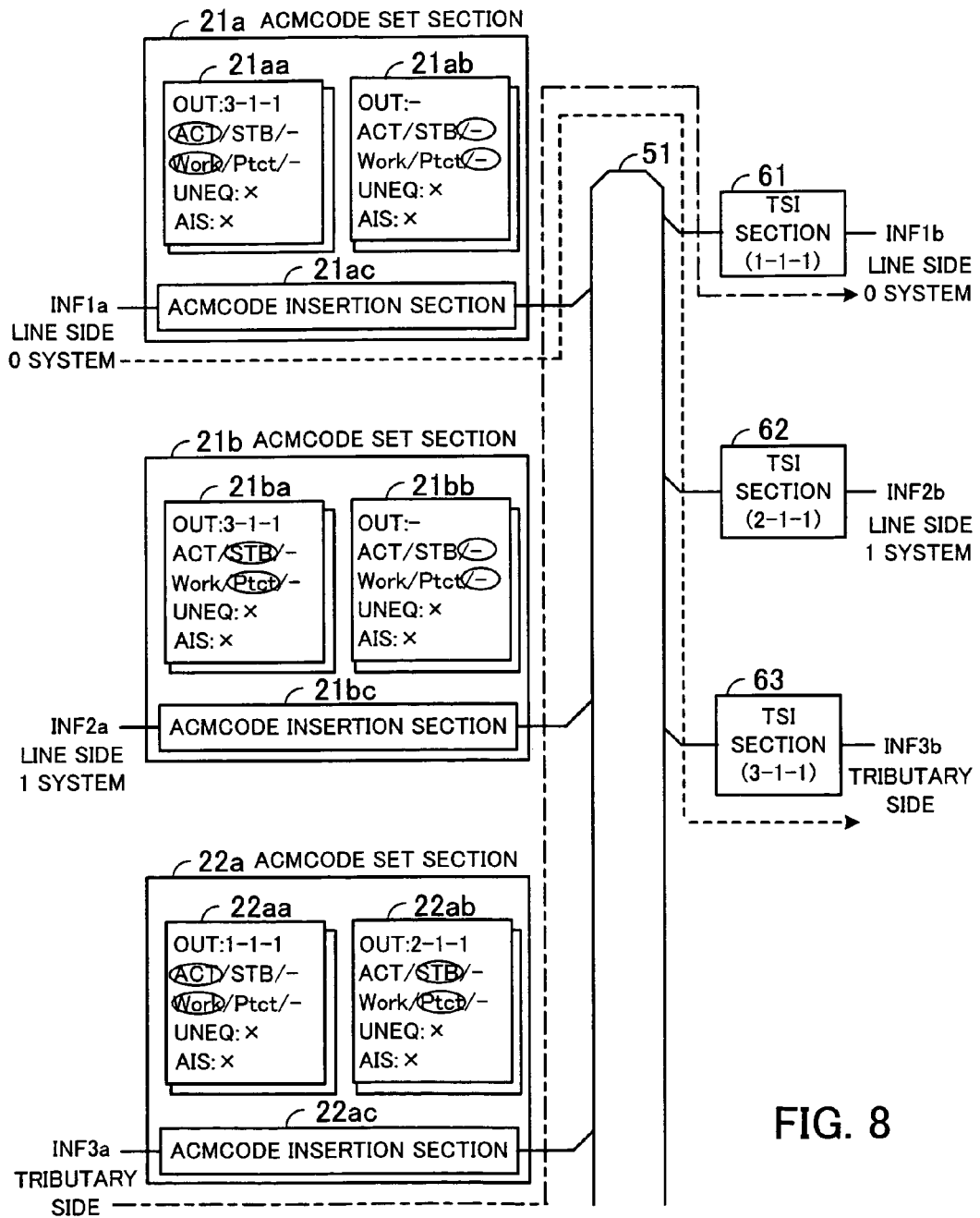
FIG. 8 is a view for describing operation performed in the case of a line being normal.

FIG. 8 is a view for describing operation performed in the case of a line being normal. In FIG. 8, part of the transmission apparatus shown in FIG. 2 are shown. That is to say, the ACMCODE set sections 21a, 21b, and 22a, the bus 51, and the TSI sections 61 through 63 are shown in FIG. 8. Addresses set in the TSI sections 61 through 63 are shown in parentheses.

ACMCODEs shown in FIG. 8 are set in the registers 21aa and 21ab and the registers 21ba and 21bb included in the ACMCODE set sections 21a and 21b, respectively, by the CODE generation section included in the ACMCODE generation section 11. In addition, ACMCODEs shown in FIG. 8 are set in the registers 22aa and 22ab included in the ACMCODE set sections 22a by the CODE generation section included in the ACMCODE generation section 12.

For example, "OUT:3-1-1" is written to the register 21aa. As a result, a signal outputted from the INF 1a is introduced into the TSI section 63 in which the address 3-1-1 is set, and is outputted to the INF 3b (path indicated by a dotted-line arrow in FIG. 8). In addition, "OUT:1-1-1" is written to the register 22aa. As a result, a signal outputted from the INF 3a is introduced into the TSI section 61 in which the address 1-1-1 is set, and is outputted to the INF 1b (path indicated by a chain-line arrow in FIG. 8).

Figure 21:
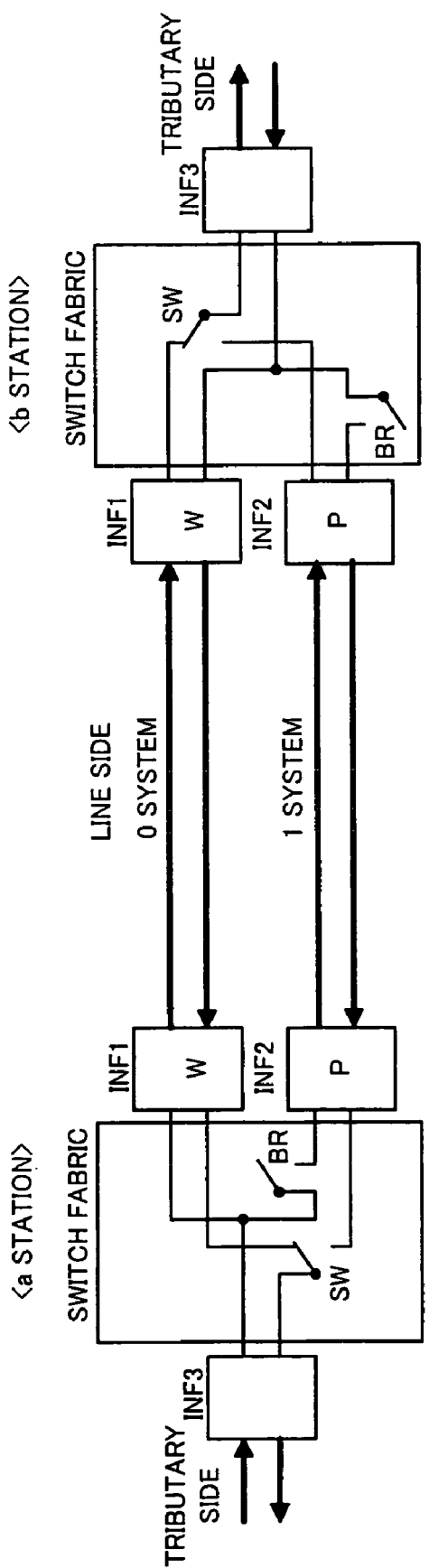
FIG. 21 is a view for describing one-to-one line redundancy.
Figure 22:
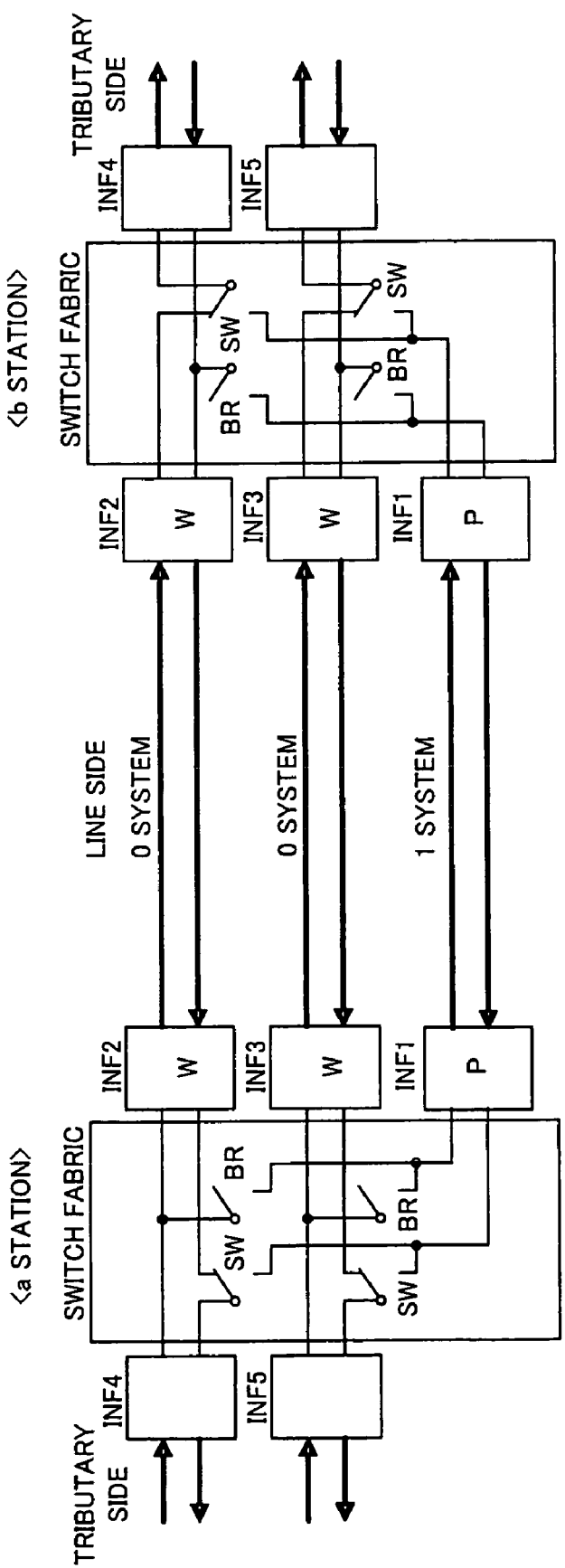
FIG. 22 is a view for describing one-to-N line redundancy.

According to the contents of the registers shown in FIG. 8, the transmission apparatus shown in FIG. 8 corresponds to, for example, the transmission apparatus in a station described in FIG. 21 and the INFs 1a and 1b, the INFs 2a and 2b, and the INFs 3a and 3b correspond to the INFs 1 through 3, respectively, in the a station shown in FIG. 21. That is to say, a line connected to the INF 1 shown in FIG. 8 belongs to the 0 system and a line connected to the INF 2 shown in FIG. 8 belongs to the 1 system.

The contents of the registers shown in FIG. 8 are generated by the CODE generation sections included in the ACMCODE generation sections 11 and 12 shown in FIG. 2. When setting information by which the line connected to the INF 1 is set as a currently used system (0 system) and by which the line connected to the INF 2 is set as a spare system (1 system) is inputted to the CODE generation sections and the ACMCODE (A) of STS3C:1-1-1→3-1-1 and STS3C:3-1-1→1-1-1 is inputted to the CODE generation sections, the contents shown in FIG. 8 are written to the registers.

Accordingly, as stated above, if the 0-system line is normal, the registers are set so that a signal outputted from the INF 3a (signal sent from a tributary side) will be outputted to the INF 1b connected to the 0-system line and so that a signal inputted to the INF 1a connected to the 0-system line will be outputted to the INF 3b (tributary side). In addition, the registers are set so that if an abnormality occurs in the 0-system line, the INF 2 connected to the 1-system line can be used.

In a transmission apparatus (corresponding to, for example, the transmission apparatus in the b station shown in FIG. 21) in another station which communicates with the transmission apparatus shown in FIG. 8, registers are set in the same way so that an INF 1 connected to the 0-system line will belong to a currently used system.

Figure 9:
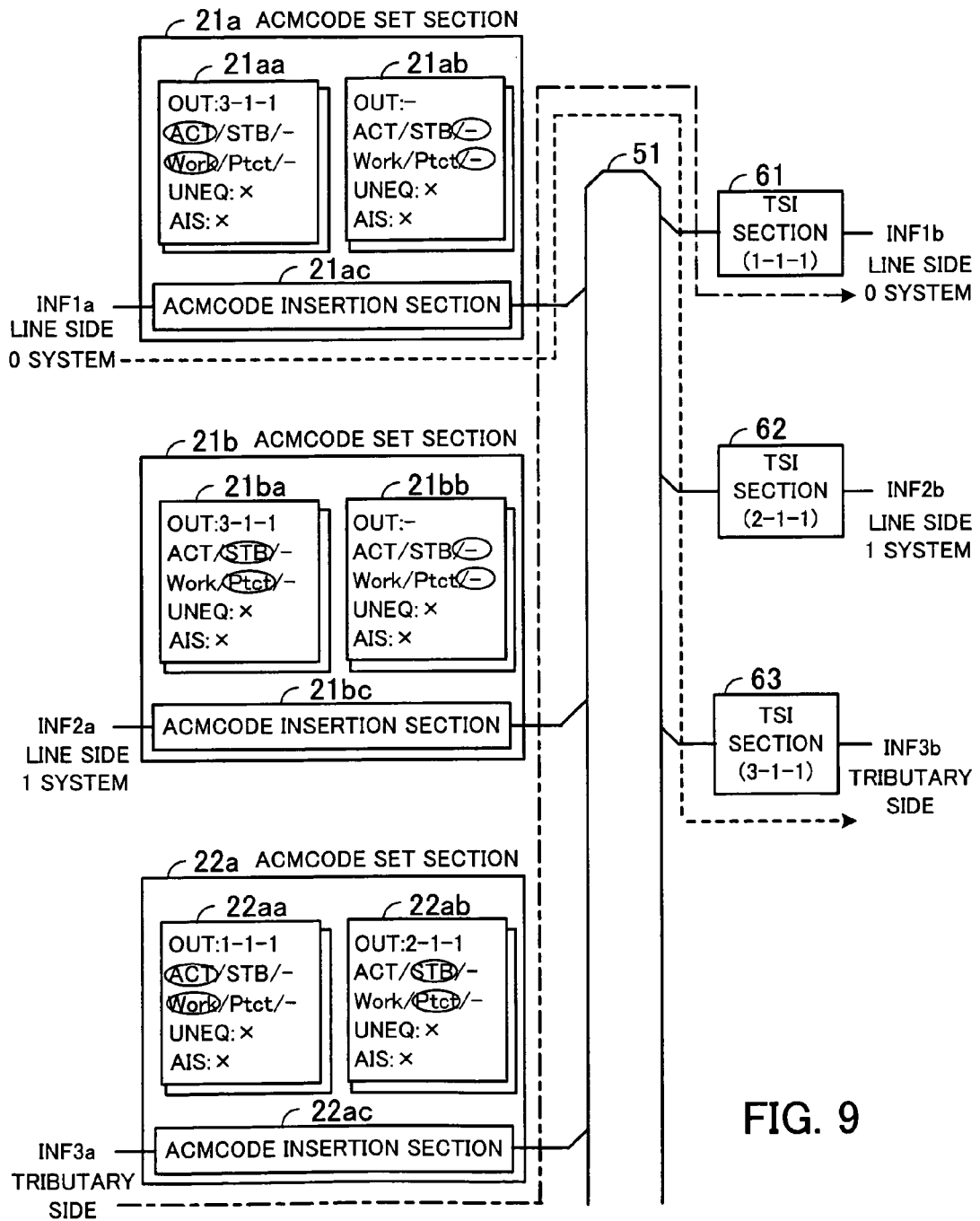
FIG. 9 shows the contents of registers in a b station.

FIG. 9 shows the contents of registers in a b station. In FIG. 9, ACMCODE set sections 21a, 21b, and 22a, a bus 51, and TSI sections 61 through 63 included in a transmission apparatus (corresponding to the transmission apparatus in the b station shown in FIG. 21) in another station which communicates with the transmission apparatus shown in FIG. 8 are shown. By setting registers as shown in FIG. 9, a signal outputted from an INF 1a connected to the 0-system line is introduced into the TSI section 63 and is outputted to an INF 3b (tributary side) (path indicated by a dotted-line arrow in FIG. 9). A signal outputted from an INF 3a (signal sent from a tributary side) is introduced into the TSI section 61 and is outputted to the 0-system line (path indicated by a chain-line arrow in FIG. 9).

Operation performed in the case of an abnormality occurring in a line will now be described.

Figure 10:
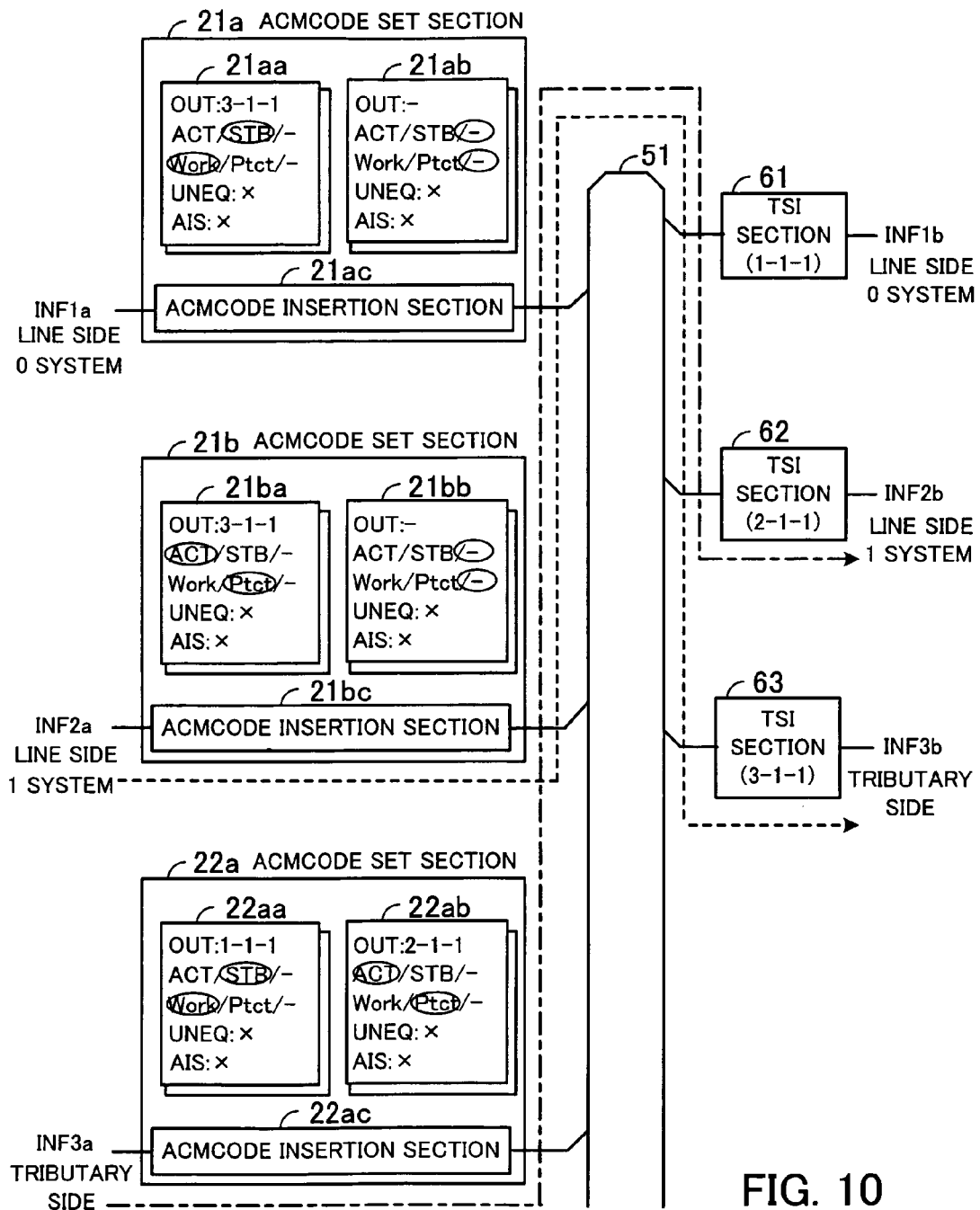
FIG. 10 is a view for describing operation performed in the case of an abnormality occurring in a line.

FIG. 10 is a view for describing operation performed in the case of an abnormality occurring in a line. The same components that are shown in FIG. 8 are shown in FIG. 10.

It is assumed that a failure (LOS) occurs in, for example, the 0-system line connected to the INF 1a (failure occurs in a line in FIG. 21 which belongs to the 0-system line and which is indicated by a left arrow).

In this case, an L-ALM (not shown) included in the INF 1a included in the transmission apparatus shown in FIG. 10 detects a LOSALM. This LOSALM is detected by the L-ALM 31a shown in FIG. 2 and is communicated to the ACMCODE generation section 11. The LOSALM is communicated to the CODE setting section 11b in the ACMCODE generation section 11 shown in FIG. 5. When the LOSALM is communicated to the CODE setting section 11b, the CODE setting section 11b changes the contents set in the registers 21aa and 21ba from the currently used system to the spare system.

For example, the CODE setting section 11b changes the contents of the registers in FIG. 8 as shown in FIG. 10. That is to say, the CODE setting section 11b changes "ACT" in the register 21aa to "STB" and changes "STB" in the register 21ba to "ACT". In addition, "ACT" in the register 22aa is changed to "STB" and "STB" in the register 22ab is changed to "ACT".

The contents of the registers are inserted into the A1, A2, B1, and E1 bytes of a main signal and are outputted to the bus 51. Each of the TSI sections 61 through 63 terminates the A1, A2, B1, and E1 bytes by the ACMCODEDECOD 91 and compares an ACMCODE included in the A1, A2, B1, and E1 bytes with its address. If the ACMCODE matches the address, then the main signal which runs through the bus 51 is introduced by the STS1. If status information is ACT, then the main signal is outputted. If status information is STB, then a UNEQ signal is outputted.

As a result, the contents of the register 22ab is "ACT," so a signal outputted from the INF 3a is introduced into the TSI section 62 the address of which is 2-1-1, and is outputted from the INF 2b to the 1-system line (path indicated by a chain-line arrow in FIG. 10). The contents of the register 21ba is "ACT," so a signal outputted from the INF 2a connected to the 1-system line is introduced into the TSI section 63 the address of which is 3-1-1, and is outputted to the INF 3b (tributary side) (path indicated by a dotted-line arrow in FIG. 10).

When the INF 1a detects the LOSALM, the INF 1b inserts an L-RDIALM indicative of a remote alarm and an ASP byte for selecting the 1-system line into an overhead of the main signal. A CODE setting section included in the transmission apparatus installed in the b station rewrites the contents of the registers on the basis of the L-RDIALM and the ASP byte for selecting the 1-system line sent from the a station. As a result, the transmission apparatus installed in the b station also switches a line from the 0 system to the 1 system.

Figure 11:
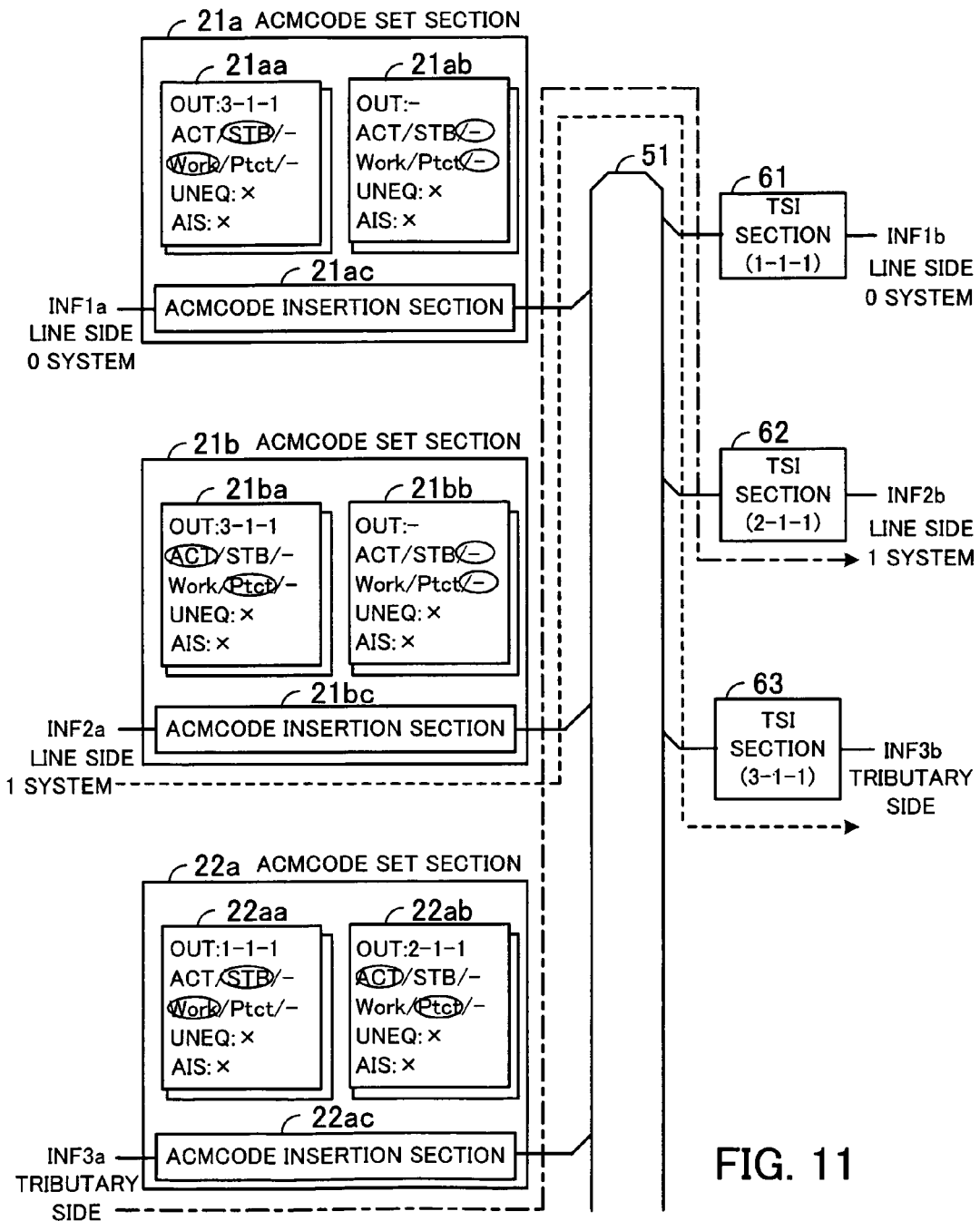
FIG. 11 shows the contents of the registers in a b station.

FIG. 11 shows the contents of the registers in a b station. In FIG. 11, ACMCODE set sections 21a, 21b, and 22a, a bus 51, and TSI sections 61 through 63 included in a transmission apparatus (corresponding to the transmission apparatus in the b station shown in FIG. 21) in another station which communicates with the transmission apparatus shown in FIG. 10 are shown. By setting registers as shown in FIG. 11, a signal outputted from an INF 2a connected to the 1-system line is introduced into the TSI section 63 and is outputted to an INF 3b (tributary side) (path indicated by a dotted-line arrow in FIG. 11). A signal outputted from an INF 3a (signal sent from a tributary side) is introduced into the TSI section 62 and is outputted to the 1-system line (path indicated by a chain-line arrow in FIG. 9).

If the failure occurs in the 0-system line, the contents of the registers included in the transmission apparatus are rewritten in this way to transmit a signal by using the 1-system line. That is to say, line redundancy is provided.

Operation performed in FIG. 2 in the case of unit redundancy will now be described. Operation performed in the case of a unit being normal will be described first.

Figure 12:
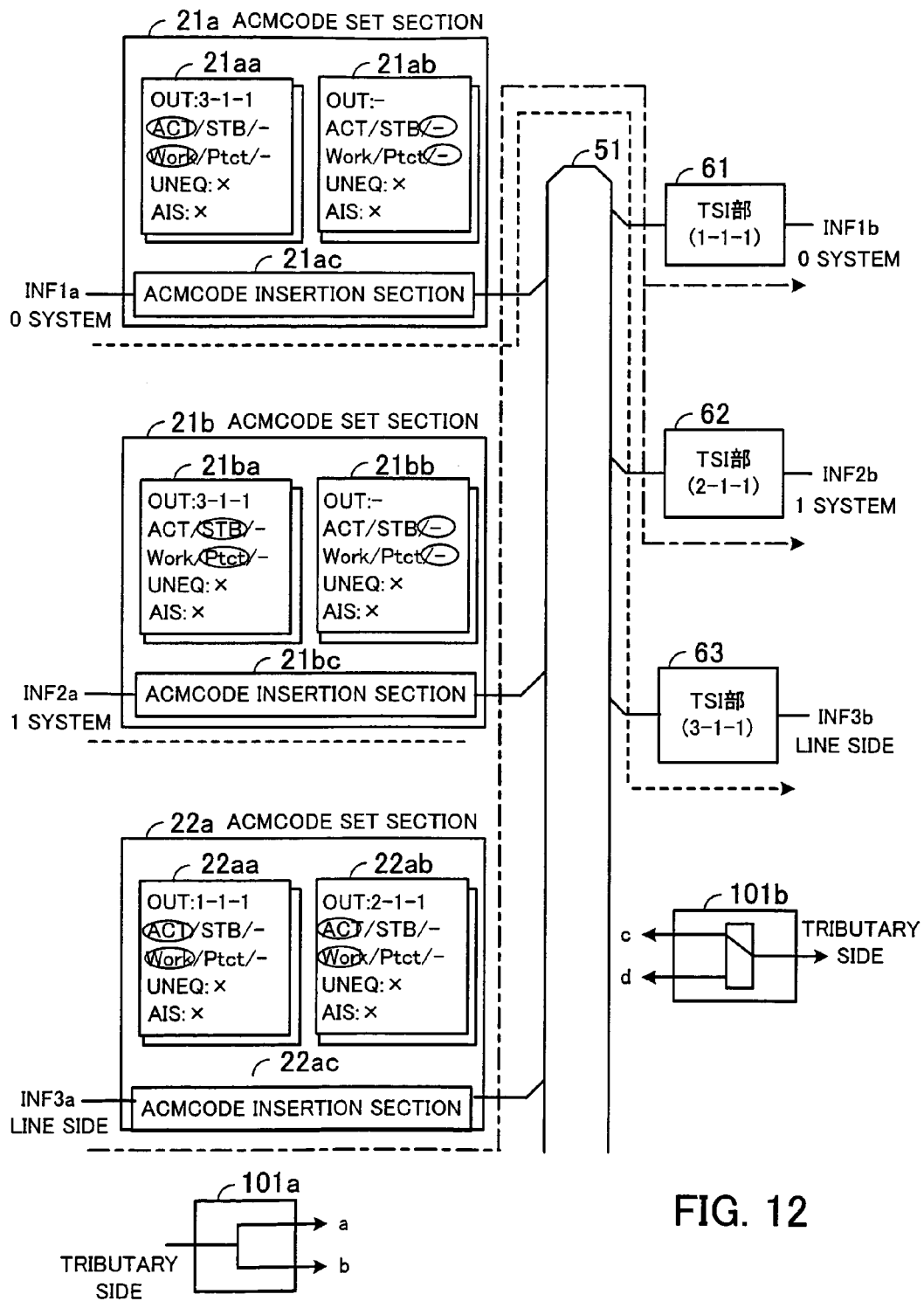
FIG. 12 is a view for describing operation performed in the case of a unit being normal.

FIG. 12 is a view for describing operation performed in the case of a unit being normal. In FIG. 12, part of the transmission apparatus shown in FIG. 2 are shown. That is to say, the ACMCODE set sections 21a, 21b, and 22a, the bus 51, and the TSI sections 61 through 63 are shown in FIG. 12.

Figure 23:
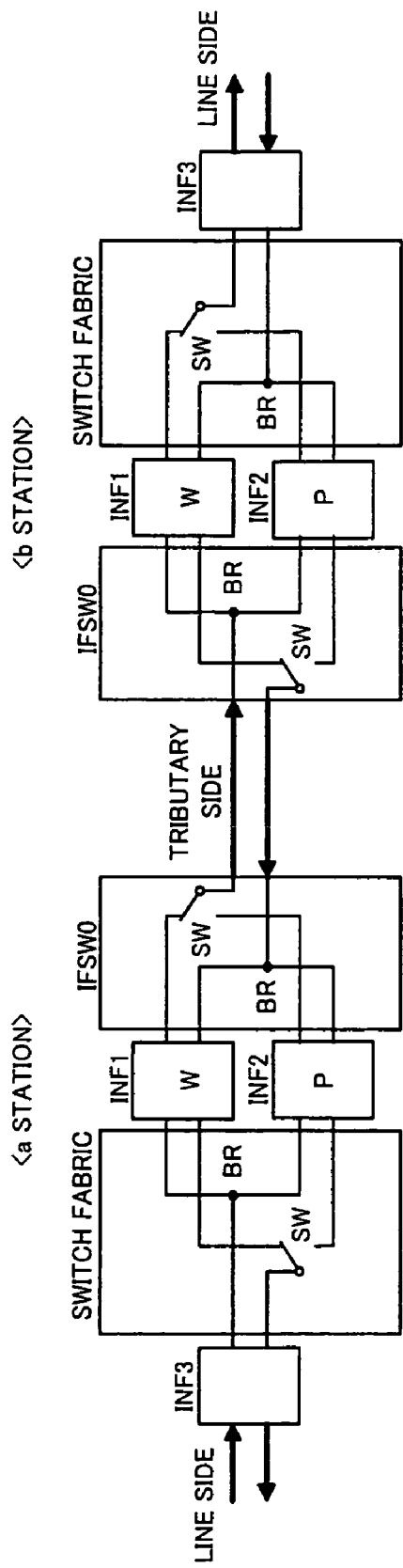
FIG. 23 is a view for describing one-plus-one unit redundancy.
Figure 24:
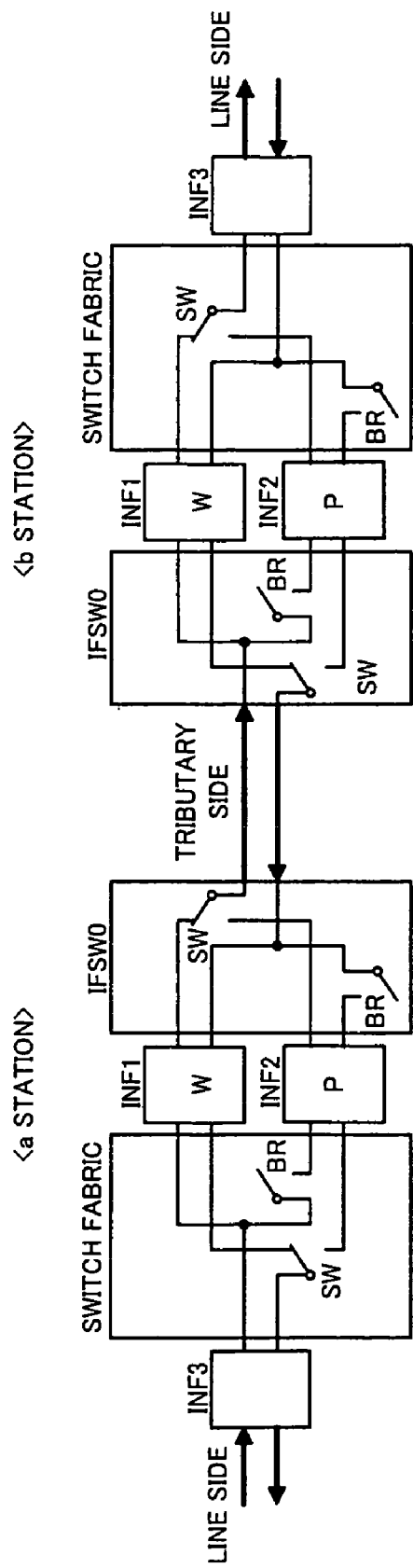
FIG. 24 is a view for describing one-to-one unit redundancy.
Figure 25:
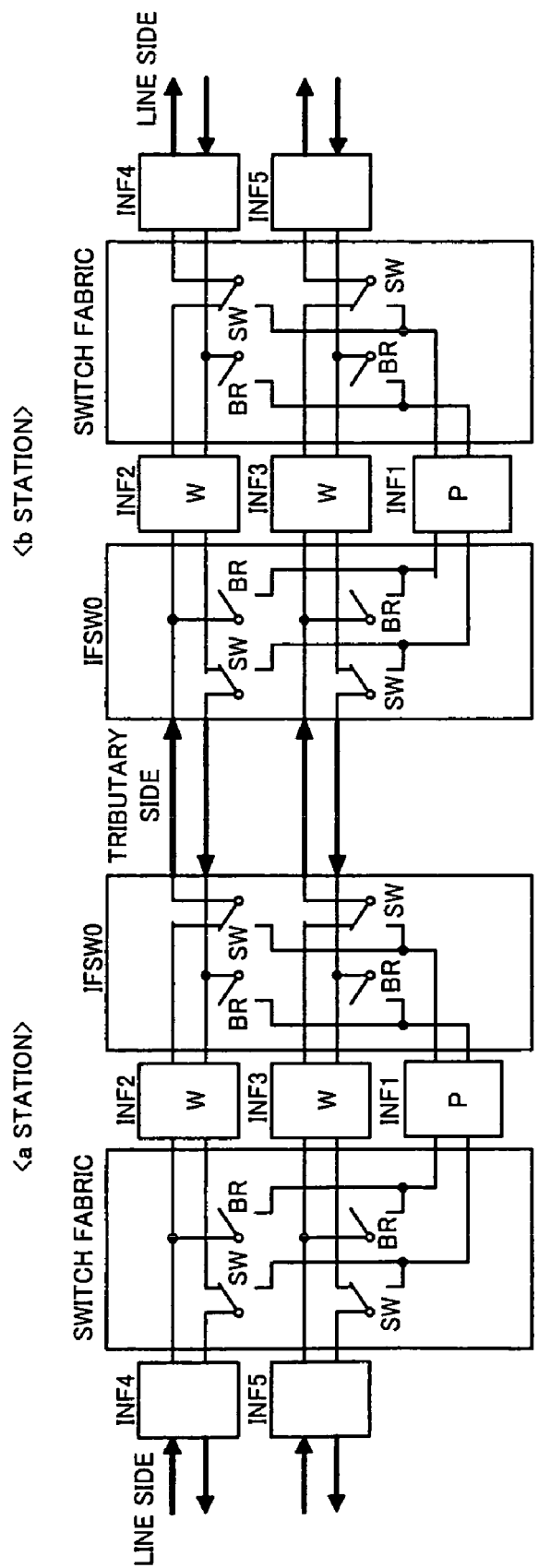
FIG. 25 is a view for describing one-to-N unit redundancy.

As shown in FIG. 12, IFSWs 101a and 101b are included in the transmission apparatus in the case of unit redundancy. The transmission apparatus shown in FIG. 12 corresponds to, for example, the transmission apparatus in the a station shown in FIG. 23 and the INFs 1a and 1b, the INFs 2a and 2b, and the INFs 3a and 3b correspond to the INFs 1 through 3, respectively, in the a station shown in FIG. 23. The IFSWs 101a and 101b correspond to the IFSW 0.

The IFSW 101a makes a signal sent from the tributary side branch in two directions and inputs them to the INFs 1a and 2a. For example, output a of the IFSW 101a is connected to the INF 1a and output b of the IFSW 101a is connected to the INF 2a. As a result, the signal sent from the tributary side is outputted to both of the INFs 1a and 2a.

The IFSW 101b outputs one of signals outputted from the INFs 1b and 2b to the tributary side. For example, input c of the IFSW 101b is connected to the INF 1b and input d of the IFSW 101b is connected to the INF 2b. As a result, one of the signals outputted from the INFs 1b and 2b is outputted to the tributary side.

ACMCODEs shown in FIG. 12 are set in the registers 21aa and 21ab and the registers 21ba and 21bb included in the ACMCODE set sections 21a and 21b, respectively, by the CODE generation section included in the ACMCODE generation section 11. In addition, ACMCODEs shown in FIG. 12 are set in the registers 22aa and 22ab included in the ACMCODE set sections 22a by the CODE generation section included in the ACMCODE generation section 12.

The contents of the registers shown in FIG. 12 are generated by the CODE generation sections included in the ACMCODE generation sections 11 and 12 shown in FIG. 2. When setting information by which the INF 1 is set as a currently used system and by which the INF 2 is set as a spare system is inputted to the CODE generation sections and the ACMCODE (A) of STS3C:1-1-1→3-1-1 and STS3C:3-1-1→1-1-1 is inputted to the CODE generation sections, the contents shown in FIG. 12 are written to the registers.

Accordingly, if the INF 1a is normal, a signal outputted from the INF 3a (signal sent from the line side) is outputted to the INFs 1b and 2b (the ACMCODE of "OUT:1-1-1," "ACT," and "Work" are set in the register 22aa and the ACMCODE of "OUT:2-1-1," "ACT," and "Work" are set in the register 22ab). That is to say, the signal outputted from the INF 3a is introduced into the TSI sections 61 and 62 (path indicated by a chain-line arrow in FIG. 12). The signals introduced into the TSI sections 61 and 62 are outputted to INFs 1b and 2b, respectively, and only the signal outputted from the INF 1b is outputted to the tributary side by the IFSW 101b.

A signal sent from the tributary side is outputted to both of the INFs 1a and 2a by the IFSW 101a. "ACT" is set in the register 21aa corresponding to the INF 1a and "STB" is set in the register 21ba corresponding to the INF 2a. That is to say, only the signal outputted from the INF 1a is introduced into the TSI section 63 (path indicated by a dotted-line arrow in FIG. 12).

In a transmission apparatus (transmission apparatus in the b station shown in FIG. 23, for example) in another station which communicates with the transmission apparatus shown in FIG. 12, registers are set in the same way so that an INF 1 will belong to a currently used system and so that an INF 2 will belong to a spare system.

Figure 13:
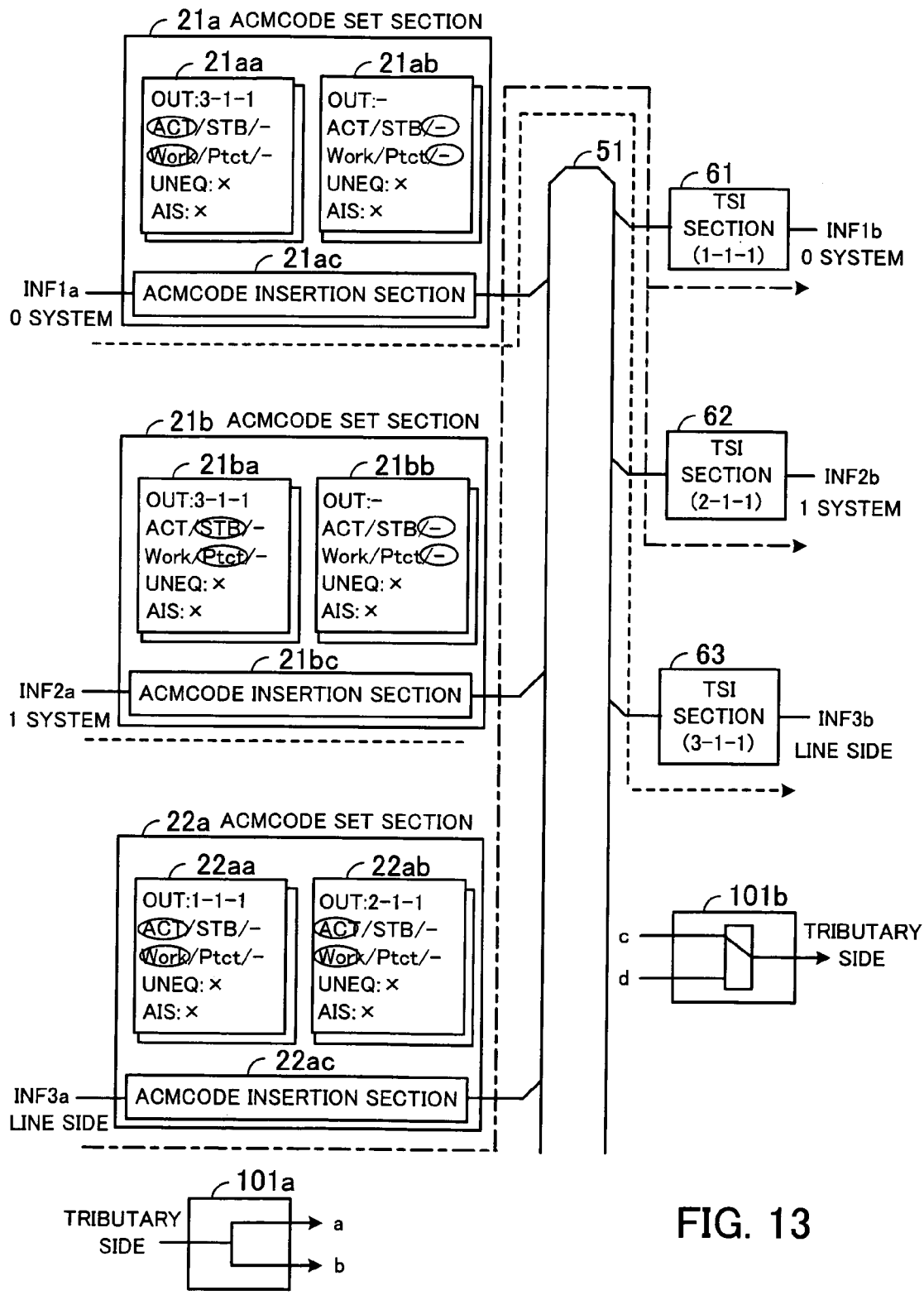
FIG. 13 shows the contents of registers in a b station.

FIG. 13 shows the contents of registers in a b station. In FIG. 13, ACMCODE set sections 21a, 21b, and 22a, a bus 51, and TSI sections 61 through 63 included in a transmission apparatus (corresponding to the transmission apparatus in the b station shown in FIG. 23) in another station which communicates with the transmission apparatus shown in FIG. 12 are shown. By setting registers as shown in FIG. 13, a signal sent from a tributary side is outputted to INFs 1a and 2a by an IFSW 101a. Only the signal outputted from the INF 1a is introduced into the TSI section 63. A signal outputted from an INF 3a (signal sent from a line side) is introduced into the TSI sections 61 and 62 and only the signal outputted from an INF 1*b* is outputted to a tributary side by an IFSW 101*b*.

Operation performed in the case of an abnormality occurring in a unit will now be described.

Figure 14:
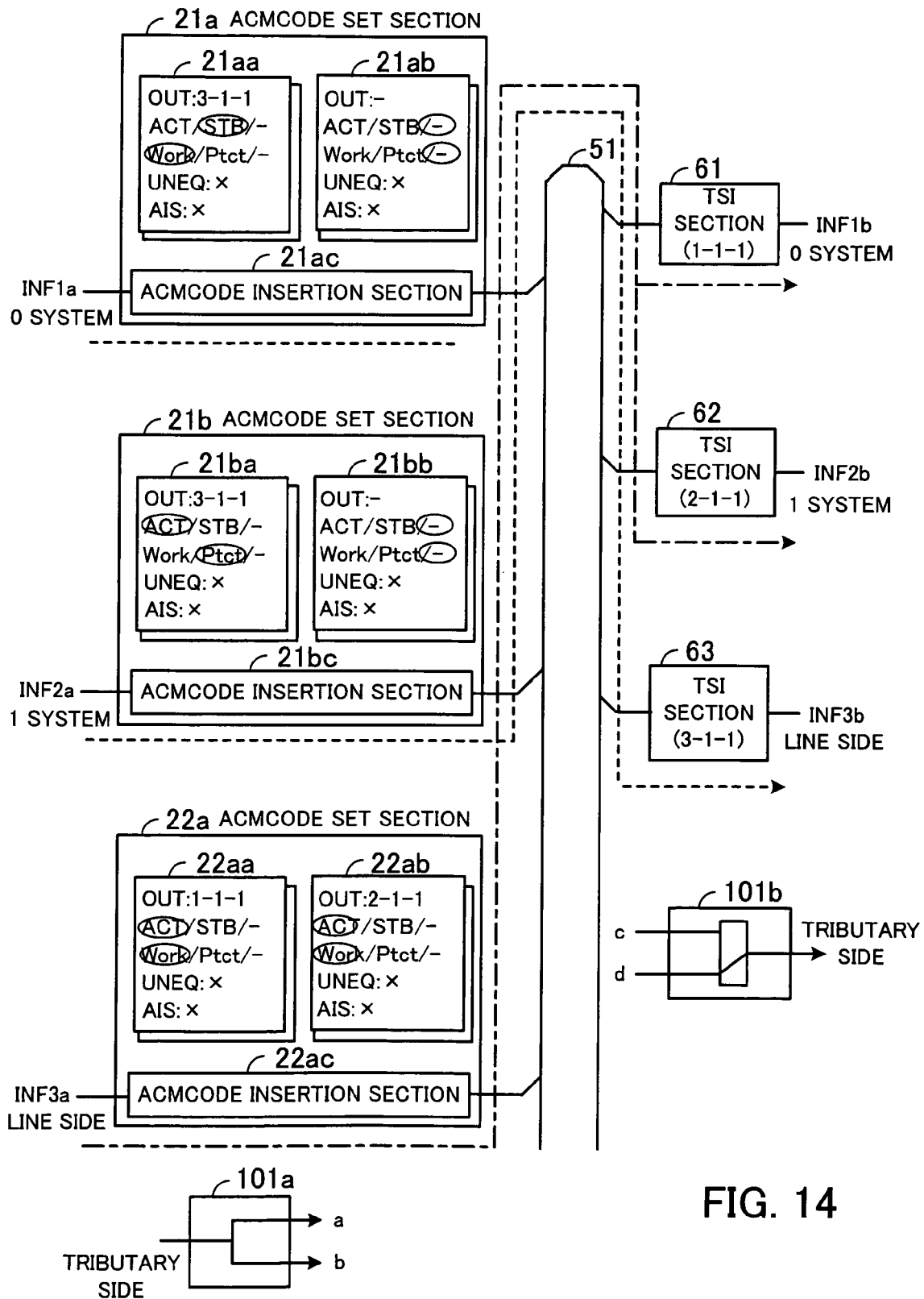
FIG. 14 is a view for describing operation performed in the case of an abnormality occurring in a unit.

FIG. 14 is a view for describing operation performed in the case of an abnormality occurring in a unit. The same components that are shown in FIG. 12 are shown in FIG. 14.

It is assumed that a failure occurs in, for example, the INF 1*a*. As stated above, a failure in the unit (INF 1*a*) is detected by the CPU unit. When the CPU unit detects a unit failure, the CPU unit outputs a CardALM 0 to the CODE setting section 11*b* included in the ACMCODE generation section 11 shown in FIG. 5. When the CODE setting section 11*b* receives the CardALM 0 outputted from the CPU unit, the CODE setting section 11*b* changes the contents of the registers in FIG. 12 as shown in FIG. 14. For example, the CODE setting section 11*b* changes "ACT" in the register 21*aa* to "STB" and changes "STB" in the register 21*ba* to "ACT". In addition, the IFSW 101*b* outputs a signal from the input d (signal outputted from the INF 2*b*) to the tributary side.

As a result, signals are outputted from the INFs 1*b* and 2*b*, but only the signal outputted from the INF 2*b* is outputted to the tributary side by the IFSW 101*b*. In addition, a signal sent from the tributary side (signals outputted from the IFSW 101*a*) is outputted to the INFs 1*a* and 2*a*. Only the signal outputted from the INF 2*a* is received by the TSI section 63 and is outputted to the INF 3*b*. That is to say, the INF 2 takes the place of the INF 1.

In the transmission apparatus installed in the a station, the unit (INF 1) which belongs to the currently used system is switched in this way to the unit (INF 2) which belongs to the spare system.

If an abnormality occurs in a unit in a b station, the unit which belongs to a currently used system is switched to a unit which belongs to a spare system in the same way that is described in FIGS. 12 and 14.

Operation performed in FIG. 2 in the case of path redundancy will now be described. Operation performed in the case of a path being normal will be described first.

Figure 15:
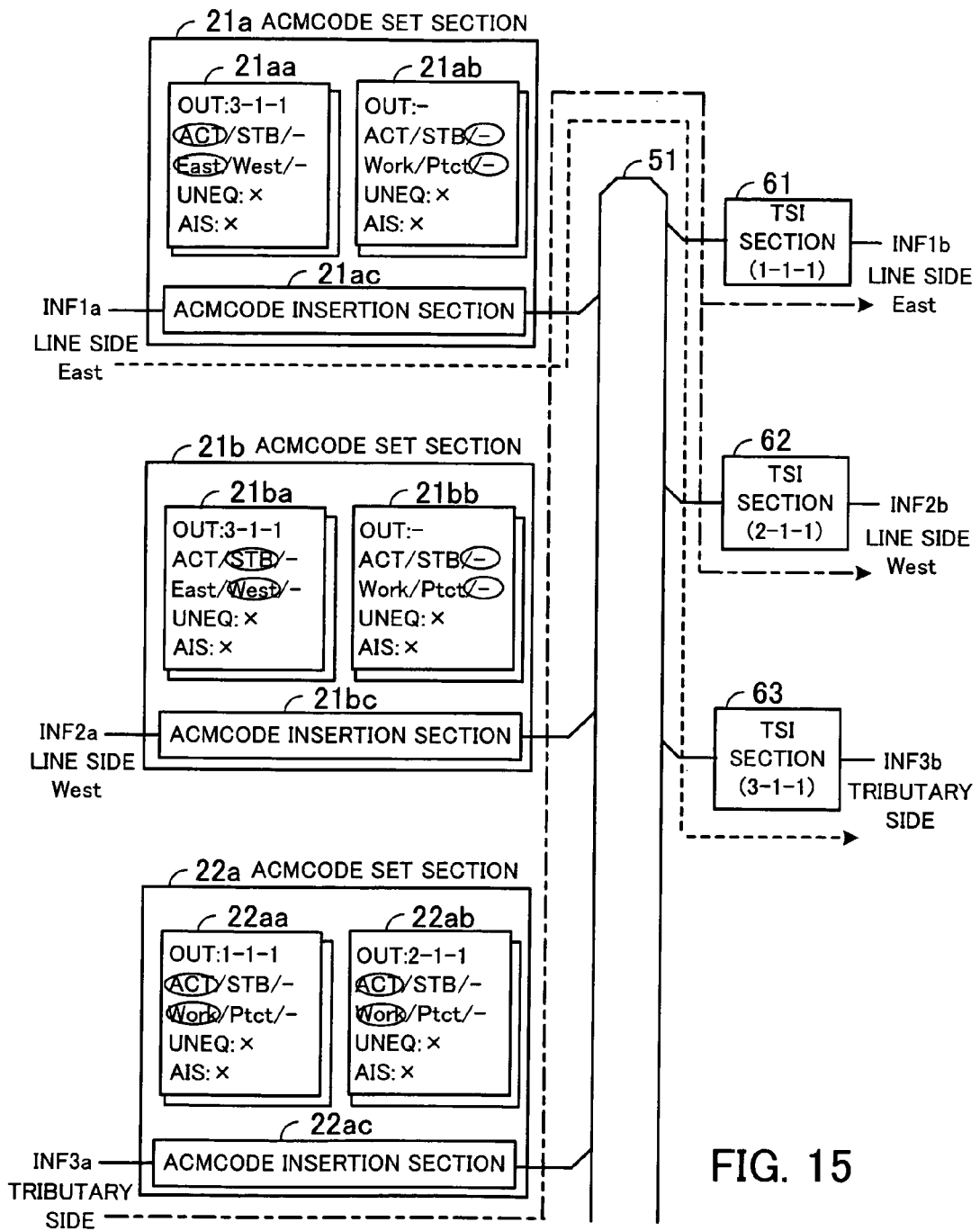
FIG. 15 is a view for describing operation performed in the case of a path being normal.

FIG. 15 is a view for describing operation performed in the case of a path being normal. In FIG. 15, part of the transmission apparatus shown in FIG. 2 are shown. That is to say, only the ACMCODE set sections 21*a*, 21*b*, and 22*a*, the bus 51, and the TSI sections 61 through 63 are shown in FIG. 15.

ACMCODEs shown in FIG. 15 are set in the registers 21*aa* and 21*ab* and the registers 21*ba* and 21*bb* included in the ACMCODE set sections 21*a* and 21*b*, respectively, by the CODE generation section included in the ACMCODE generation section 11. In addition, ACMCODEs shown in FIG. 15 are set in the registers 22*aa* and 22*ab* included in the ACMCODE set sections 22*a* by the CODE generation section included in the ACMCODE generation section 12.

For example, "OUT:3-1-1" is written to the register 21*aa*. Therefore, a signal outputted from the INF 1*a* is introduced into the TSI section 63 the address of which is 3-1-1, and is outputted to the INF 3*b* (path indicated by a dotted-line arrow in FIG. 15). "OUT:1-1-1" is written to the register 22*aa* and "OUT:2-1-1" is written to the register 22*ab*. Therefore, a signal outputted from the INF 3*a* is introduced into the TSI sections 61 and 62 the addresses of which are 1-1-1 and 2-1-1 respectively, and is outputted to the INFs 1*b* and 2*b* (path indicated by a chain-line arrow in FIG. 15).

When setting information by which the INFs 1 and 2 and path redundancy are set as East, West, and UPSR respectively is inputted, STS1:3-1-1→1-1-1, STS1:3-1-1→2-1-1, and STS1:1-1-1→3-1-1 are set as an ACMCODE (A), and STS1: 3-1-1→1-1-1, STS1:3-1-1→2-1-1, and STS1:2-1-1→3-1-1 are set as an ACMCODE (B), the contents shown in FIG. 15 are written to the registers.

Figure 26:
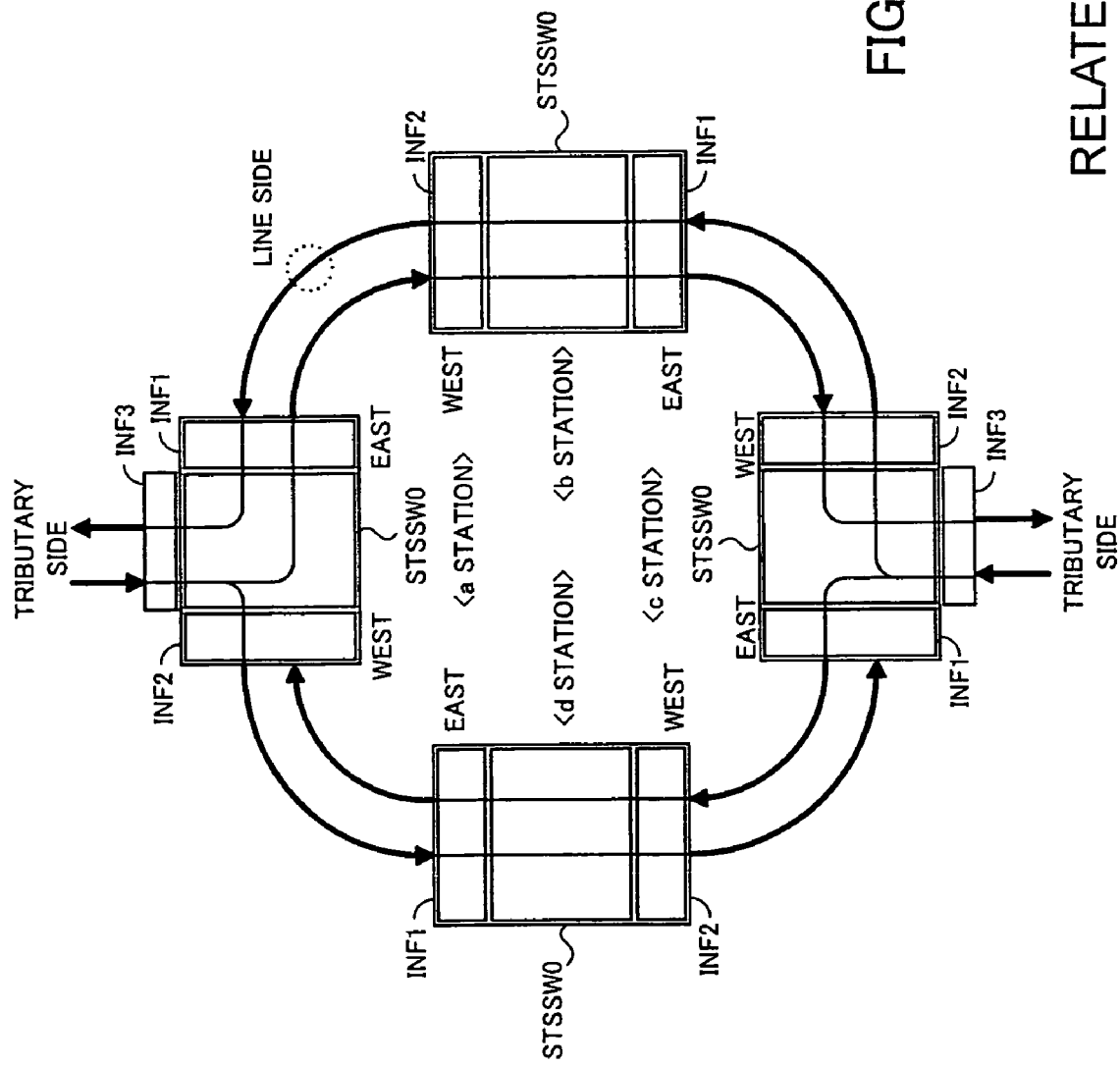
FIG. 26 is a view for describing path redundancy in a UPSR.
Figure 27:
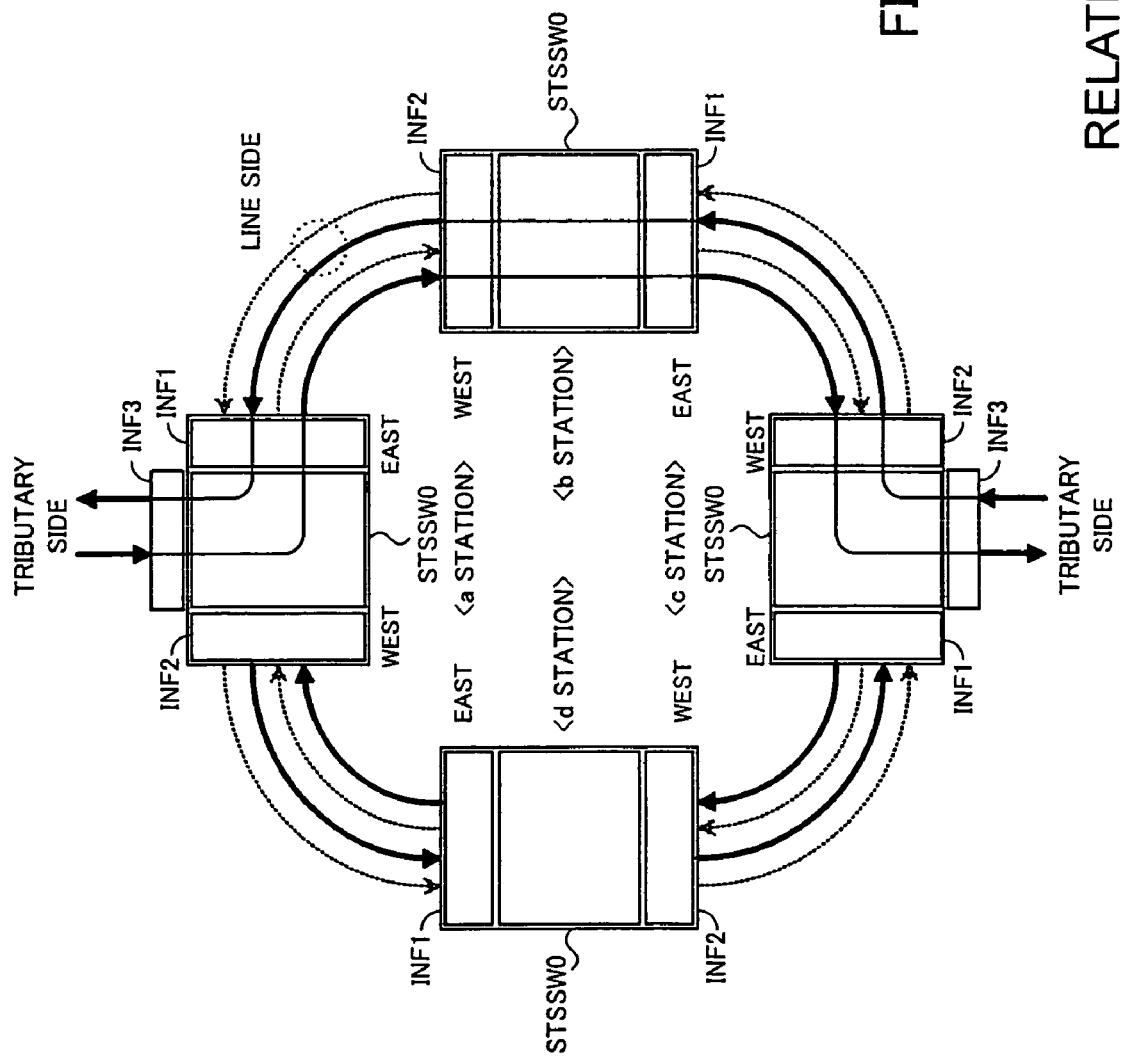
FIG. 27 is a view for describing path redundancy in a BLSR.
Figure 28:
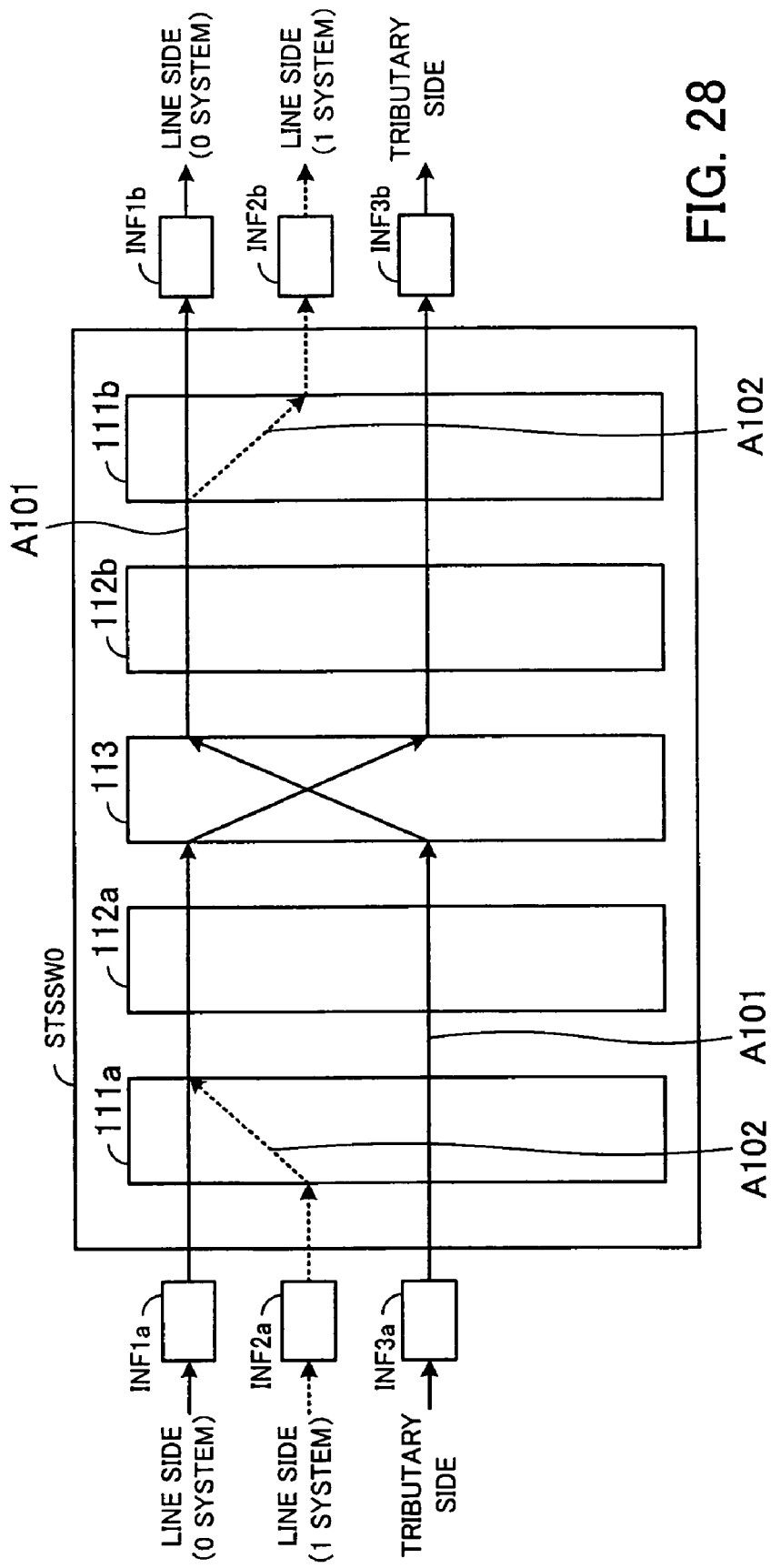
FIG. 28 is a view for describing the details of the one-to-one line redundancy.
Figure 29:
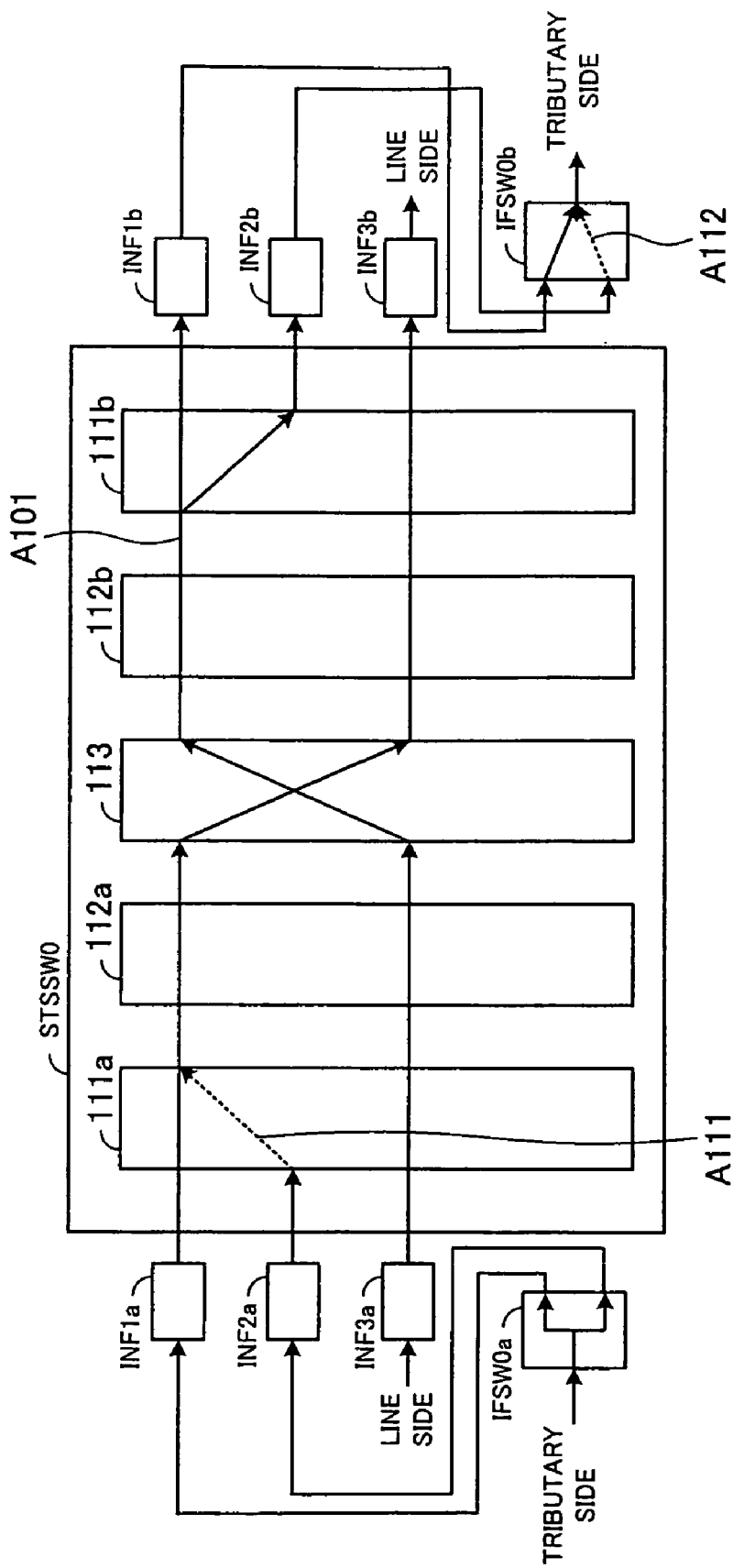
FIG. 29 is a view for describing the details of the one-plus-one unit redundancy.
Figure 30:
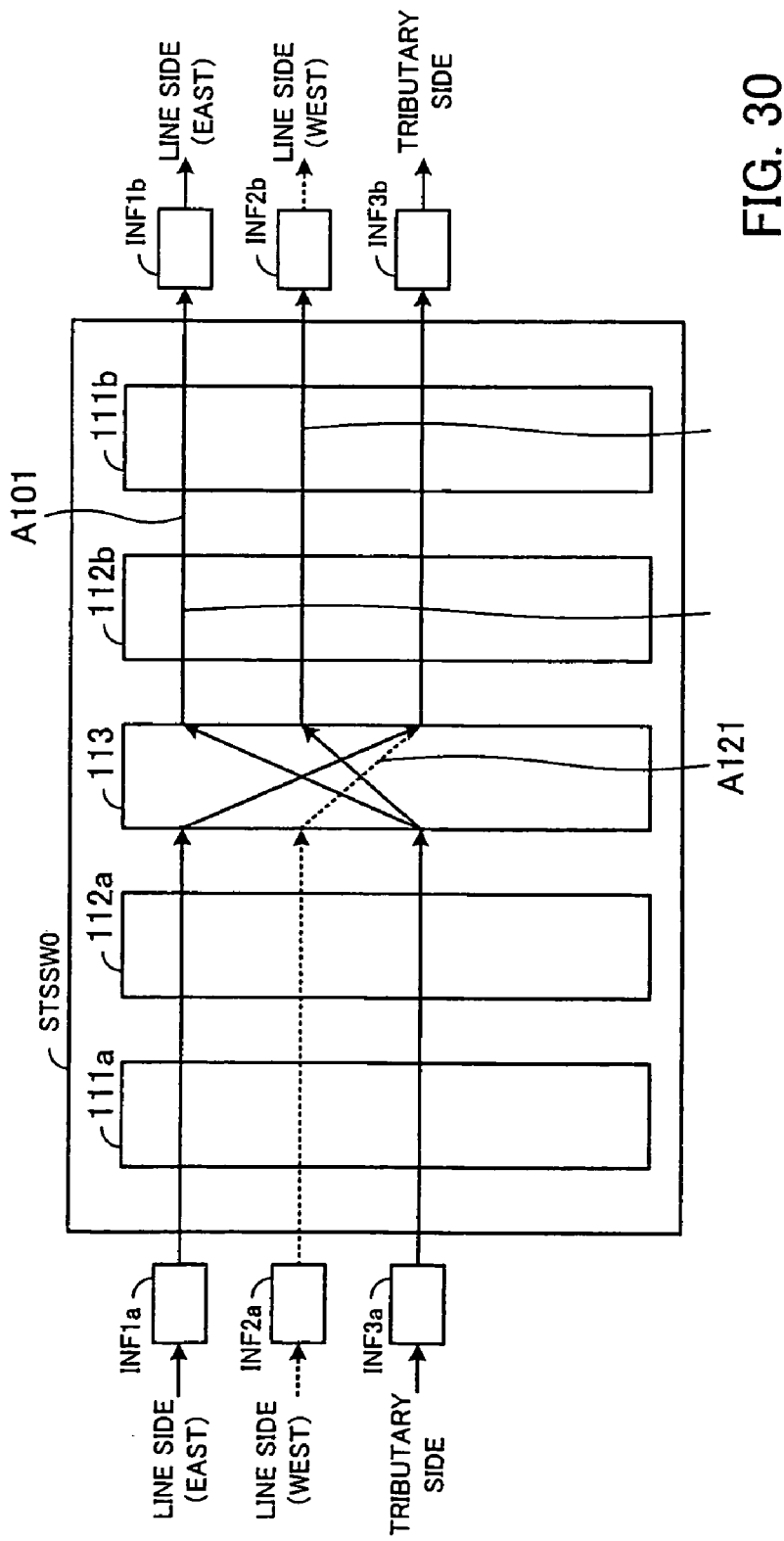
FIG. 30 is a view for describing the details of the path redundancy in a UPSR.

The transmission apparatus shown in FIG. 15 corresponds to, for example, the transmission apparatus in the a station shown in FIG. 26. The INFs 1*a* and 1*b* correspond to the INF 1 on the East side shown in FIG. 26. The INFs 2*a* and 2*b* correspond to the INF 2 on the West side shown in FIG. 26. The INFs 3*a* and 3*b* correspond to the INF 3 on the tributary side shown in FIG. 26. That is to say, if a path is normal, a signal inputted from the INF 3*a* on the tributary side is outputted from both of the INF 1*b* on the East side and the INF 2*b* on the West side (path indicated by a chain-line arrow in FIG. 15). A signal outputted from the INF 1*a* connected to the path is outputted to the INF 3*b* on the tributary side (path indicated by a dotted-line arrow in FIG. 15).

The contents of registers included in a transmission apparatus corresponding to the transmission apparatus in the b and d stations shown in FIG. 26 will now be described.

Figure 16:
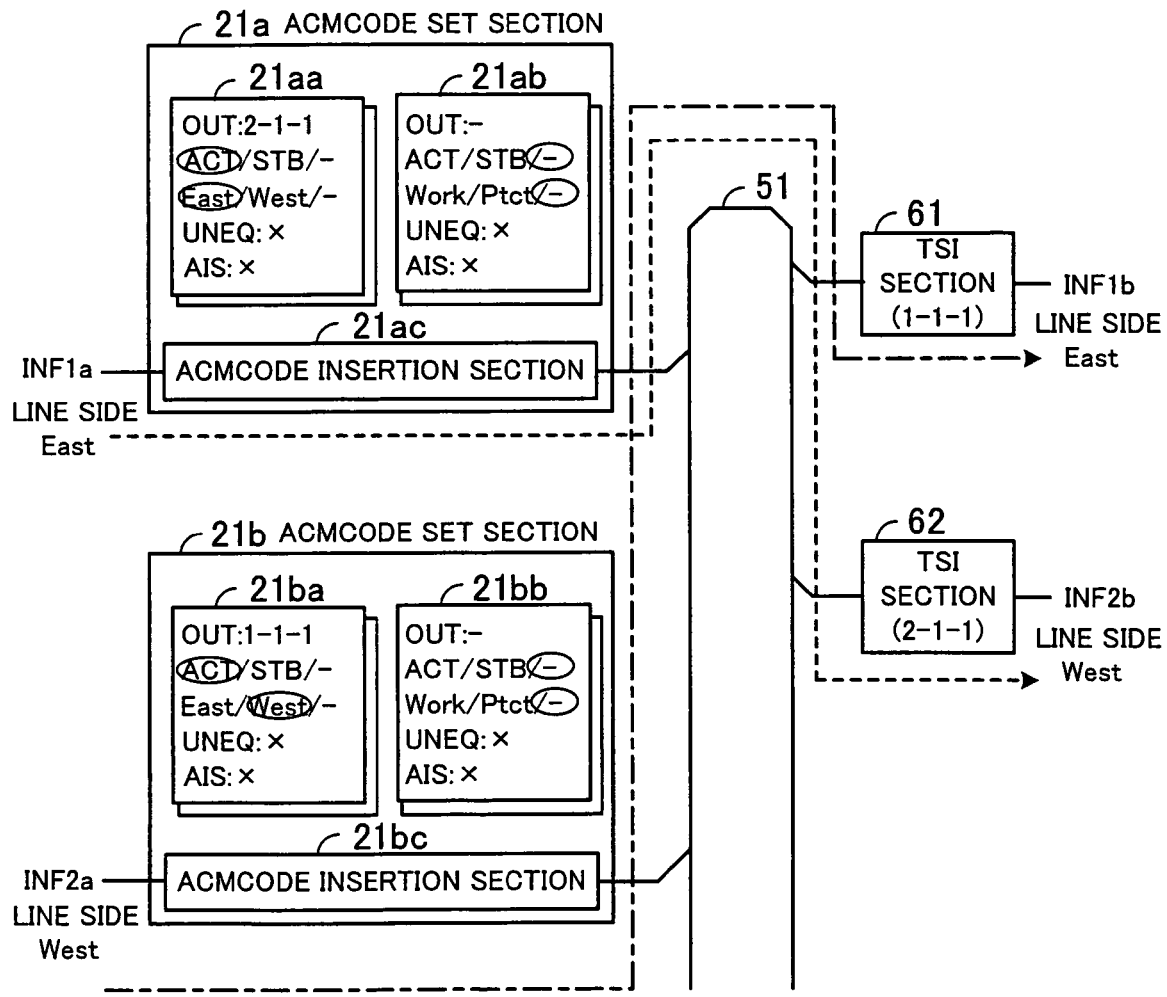
FIG. 16 shows the contents of registers included in transmission apparatus corresponding to the transmission apparatus in the b and d stations shown in FIG. 26.

FIG. 16 shows the contents of registers included in a transmission apparatus corresponding to the transmission apparatus in the b and d stations shown in FIG. 26. With the transmission apparatus in the b and d stations, a signal is not sent to or received from a tributary side. Accordingly, the transmission apparatus shown in FIG. 16 includes only INFs 1 and 2.

Contents shown in FIG. 16 are written to registers 21*aa*, 21*ab*, 21*ba*, and 21*bb*. As a result, a signal outputted from an INF 1*a* is outputted to an INF 2*b* (path indicated by a dotted-line arrow in FIG. 16). A signal outputted from an INF 2*a* is outputted to an INF 1*b* (path indicated by a chain-line arrow in FIG. 16). That is to say, each of the transmission apparatus installed in the b and d stations outputs a signal inputted from the East side to the West side and outputs a signal inputted from the West side to the East side.

The contents of registers included in a transmission apparatus corresponding to the transmission apparatus in the c station shown in FIG. 26 will now be described.

Figure 17:
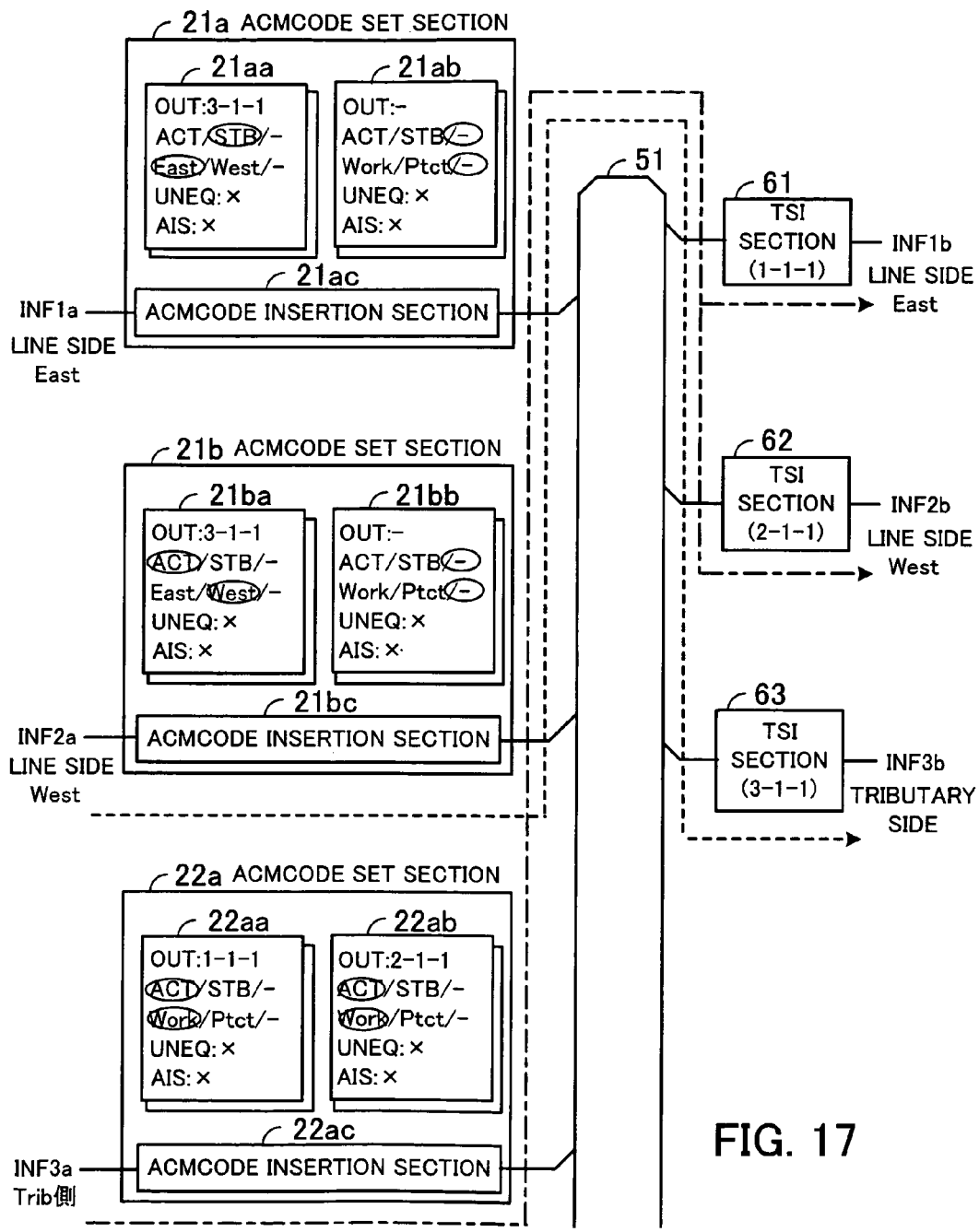
FIG. 17 shows the contents of registers included in a transmission apparatus corresponding to the transmission apparatus in the c station shown in FIG. 26.

FIG. 17 shows the contents of registers included in a transmission apparatus corresponding to the transmission apparatus in the c station shown in FIG. 26. Contents shown in FIG. 17 are written to registers 21*aa*, 21*ab*, 21*ba*, and 21*bb*. As a result, a signal outputted from an INF 2*a* is outputted to an INF 3*b* (path indicated by a dotted-line arrow in FIG. 17). A signal outputted from an INF 3*a* is outputted to INFs 1*b* and 2*b* (path indicated by a chain-line arrow in FIG. 17). That is to say, the transmission apparatus installed in the c station outputs a signal inputted from the tributary side (signal outputted from the INF 3*a*) to the INF 1*b* on the East side and the INF 2*b* on the West side. In addition, the transmission apparatus installed in the c station outputs a signal inputted from the West side (signal outputted from the INF 2*a*) to the INF 3*b* on the tributary side.

Operation performed in the case of an abnormality occurring in a path will now be described.

Figure 18:
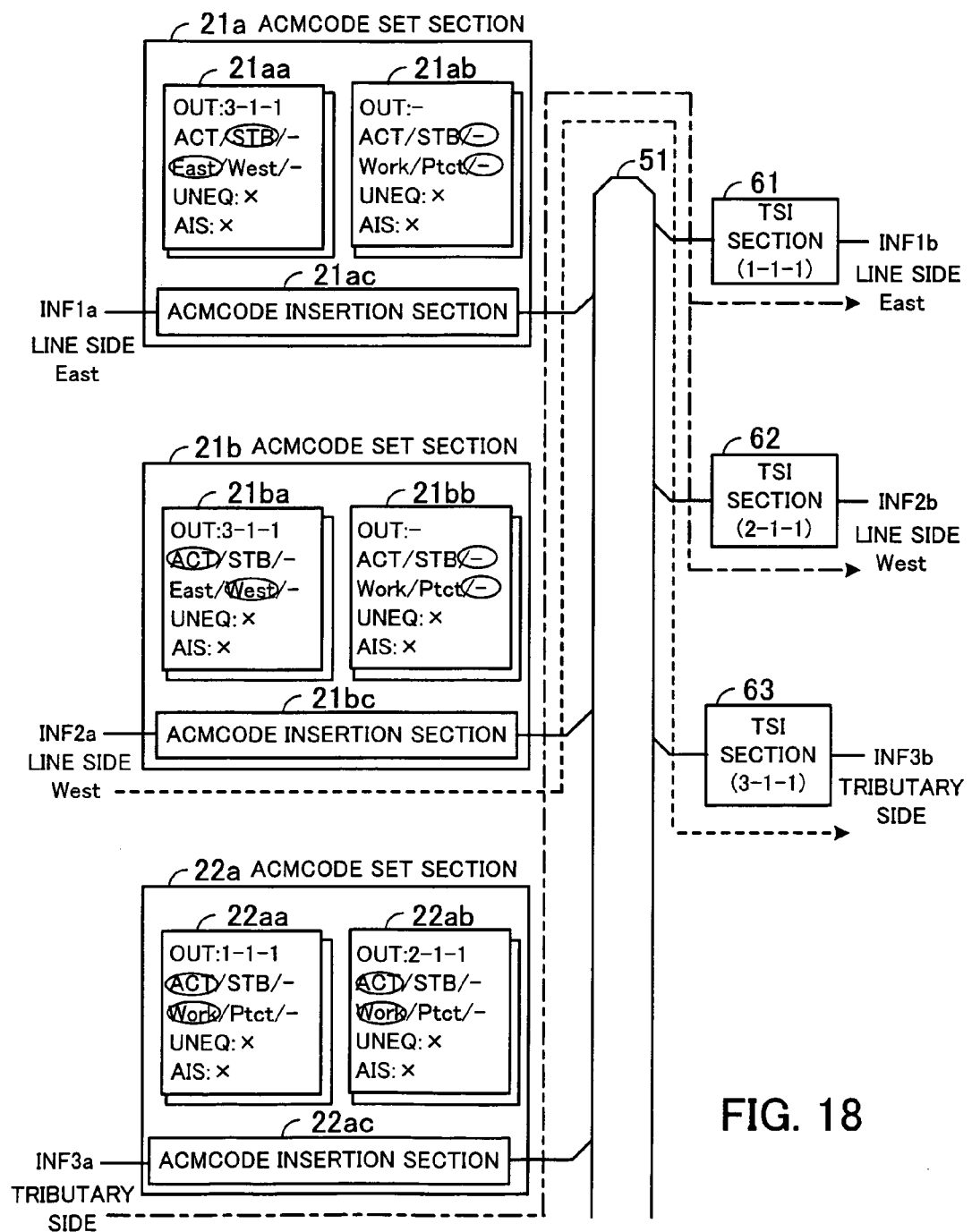
FIG. 18 is a view for describing operation performed in the case of an abnormality occurring in a path.

FIG. 18 is a view for describing operation performed in the case of an abnormality occurring in a path. The same components that are shown in FIG. 15 are shown in FIG. 18. That is to say, components included in a transmission apparatus corresponding to the transmission apparatus in the a station shown in FIG. 26 are shown.

It is assumed that a failure occurs in a path between, for example, the transmission apparatus installed in the a station and the transmission apparatus installed in the b station (portion enclosed with the dotted-line circle in FIG. 26).

In this case, the INF 1 included in the transmission apparatus installed in the a station detects the path failure and generates a P-ALM indicative of the path failure. The P-ALM/C 41*a* shown in FIG. 2 detects the P-ALM. The path failure may be an alarm indication signal-path (AIS-P), an unequipped-path (UNEQ-P), a payload mismatch-path (PLM-P), a trace identifier mismatch-path (TIM-P), a B3 error data generated major (B3MAJ), or the like.

The P-ALM/C 41*a* detects concatenation information and determines whether to detect a path alarm on each path of a main signal or to detect a path alarm at a head portion of a main signal. The concatenation information is set in H1 and H2 bytes included in the section overhead (SOH) bytes shown in FIG. 6. The INF 1 terminates the H1 and H2 bytes (concatenation information) included in the SOH bytes, encodes the concatenation information, inputs the concatenation information again into the E1 bytes of the main signal, and sends the main signal to an STSSW.

The P-ALM detected by the P-ALM/C 41*a* is outputted to the CODE setting section 11*b* included in the ACMCODE generation section 11. When the CODE setting section 11*b* receives the P-ALM, the CODE setting section 11*b* changes the contents of the registers from currently used system settings to spare system settings.

For example, the CODE setting section 11*b* changes the contents of the registers in FIG. 15 as shown in FIG. 18. That is to say, the CODE setting section 11*b* changes "ACT" in the register 21*aa* to "STB" and changes "STB" in the register 21*ba* to "ACT".

As a result, a signal sent via the path which was used by the INF 1*a* for receiving is received by the INF 2*a* and is outputted to the INF 3*b* on the tributary side. That is to say, the transmission apparatus in the a station shown in FIG. 26 receives a signal which is to be received from the East side from the West side and outputs the signal to the tributary side.

The contents of the registers included in the transmission apparatus installed in the b, c, and d stations are not changed from those shown in FIGS. 16 and 17.

As has been described in the foregoing, the transmission apparatus according to the present invention does not include a plurality of switches, cross-connects a main signal, and can handle various redundancy settings determined by a user. In addition, the transmission apparatus according to the present invention does not include a plurality of switches, so costs can be reduced.

In the transmission apparatus according to the present invention, the address information generation section generates address information to which a signal is to be outputted from redundancy setting information and cross connect setting information. The activation information setting section activates and deactivates activation information included in the address information according to failure. The address information insertion section inserts the address information stored in the address information storage section into the signal and outputs the signal to a bus. The signal output section receives the signal in which the address information is the same as address information set therefor and outputs the signal to a next stage in the case of the activation information indicating activation. As a result, the transmission apparatus according to the present invention does not include a plurality of switches, cross-connects a signal, and can handle various redundancy settings determined by a user.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission apparatus for cross-connecting signals, the apparatus comprising:
   a plurality of address information storage sections to store a plurality of pieces of address information each of which indicates a destination of a signal and includes activation information indicating an activated or deactivated state of the address information as determined by redundancy setting information;
   an activation information setting section to change the activation information included in the address information stored in the address information storage sections when failure occurs;
   a bus;
   a plurality of address information insertion sections, coupled to the bus and the address information storage sections, to insert the address information stored in the corresponding address information storage sections into each received signal and output resulting signals containing the address information to the bus; and
   a plurality of signal output sections, coupled to the bus, to receive the signals address thereto output the signals to a next stage if the activation information included in the address information of the received signals indicates an activated state of that address information.

2. The transmission apparatus according to claim 1, wherein the address information further includes information about a mounted slot to which the signal is outputted, a number of lines, and a Synchronous Transport Signal Level 1 (STS1) path.

3. The transmission apparatus according to claim 1, wherein the failure includes a line failure, a unit failure, and a path failure.

4. The transmission apparatus according to claim 3, wherein an interface (INF) unit detects the line failure and notifies the activation information setting section of the line failure.

5. The transmission apparatus according to claim 3, wherein a CPU unit detects the unit failure and notifies the activation information setting section of the unit failure.

6. The transmission apparatus according to claim 3, wherein an interface (INF) unit detects the path failure and notifies the activation information setting section of the path failure.

7. The transmission apparatus according to claim 1, wherein the redundancy setting information is information regarding setting of a currently used system and a spare system in line redundancy, unit redundancy, or path redundancy.

\* \* \* \* \*

UNITED STATES PATENT AND TRADEMARK OFFICE
CERTIFICATE OF CORRECTION

PATENT NO. : 7,660,308 B2
APPLICATION NO. : 11/583117
DATED : February 9, 2010
INVENTOR(S) : Kenichi Hasegawa et al.

It is certified that error appears in the above-identified patent and that said Letters Patent is hereby corrected as shown below:

Claim 1, at Col. 20, line 31, change "address" to "addressed".

Signed and Sealed this

Eleventh Day of May, 2010

David J. Kappos
*Director of the United States Patent and Trademark Office*